(12) United States Patent
Gill et al.

(10) Patent No.: US 6,198,773 B1
(45) Date of Patent: Mar. 6, 2001

(54) VIDEO MEMORY MANAGEMENT FOR MPEG VIDEO DECODE AND DISPLAY SYSTEM

(75) Inventors: Aharon Gill; Elan Rosenthal; Miri Fraenkel; Ram Ofir, all of Haifa (IL); David Anisman, Los Altos, CA (US); Alon Ironi, Haifa (IL); Paul R. Goldberg, Palo Alto, CA (US)

(73) Assignee: Zoran Corporation, Santa Clara, CA (US)

(*) Notice: Subject to any disclaimer, the term of this patent is extended or adjusted under 35 U.S.C. 154(b) by 0 days.

(21) Appl. No.: 08/993,796

(22) Filed: Dec. 18, 1997

(51) Int. Cl.[7] .................. H04N 7/36; H04N 7/50
(52) U.S. Cl. .......... 375/240.26; 348/716; 348/718; 375/240.15; 375/240.25
(58) Field of Search .............. 375/240.26, 240.12, 375/240.15, 240.25; 348/716, 717, 718; H04N 7/36, 7/50

(56) References Cited

U.S. PATENT DOCUMENTS

| Re. 31,460 | 12/1983 | Dalton et al. | 348/458 |
|---|---|---|---|
| 4,435,792 | 3/1984 | Bechtolsheim | 348/714 |
| 5,343,248 | 8/1994 | Fujinami | 348/452 |
| 5,363,138 | 11/1994 | Hayashi et al. | 348/718 |
| 5,386,233 | 1/1995 | Keith | 375/240.07 |
| 5,513,301 | 4/1996 | Wakasu | 358/1.15 |
| 5,561,465 | 10/1996 | Fautier et al. | 375/240.12 |
| 5,581,310 * | 12/1996 | Vinekar et al. | 348/718 |
| 5,635,985 | 6/1997 | Boyce et al. | 375/240.15 |
| 5,646,693 | 7/1997 | Cismas | 375/240.15 |
| 5,668,599 | 9/1997 | Cheney et al. | 375/240.15 |
| 5,675,387 * | 10/1997 | Hoogenboom et al. | 375/240.15 |
| 6,104,876 * | 8/2000 | Daum et al. | 710/37 |

FOREIGN PATENT DOCUMENTS

| 0778709A1 | 6/1997 | (EP) | H04N/7/50 |
|---|---|---|---|
| 0794675A2 | 9/1997 | (EP) | H04N/7/50 |
| 0825781A2 | 2/1998 | (EP) | H04N/7/50 |
| 0843485A2 | 5/1998 | (EP) | H04N/7/50 |
| 6051282 | 2/1994 | (JP) . | |

OTHER PUBLICATIONS

Fox, S.J., et al., "Multiple Error Correction Algorithm For Halftone, Continuous Tone and Text Reproduction," *IBM Technical Disclosure Bulletin*, vol. 23, No. 10, (Mar. 1981) pp. 4433–4435.

Cantineau, O., et al., "Architecture of a Memory Managaer for an MPEG–2 Video Decoding Circuit," *Journal of VLSI Signal Processing*, vol. 20, pp. 251–265 (1998).

Text Book: Haskell, B.G., et al., "Digital Video: An Introduction to MPEG–2," *Chapman & Hall*, copyright 1997.

Article extracted from Website: Chiariglione, L., "MPEG and Multimedia Communications," CSELT—Torino, Italy.

Article extracted from Website: VideoDiscovery, DVD Frequently Asked Questions (with answers!), written and maintained by Jim Taylor.

Article extracted from Website: Fogg, C. MPEG–2 FAQ Question that Should be Frequently Asked About MPEG, version 3.8 (Apr. 2, 1996).

International Organisation for Standardisation Organisation Internationale de Normalisation, ISO/IEC 13818–2, Coding of Moving Pictures ns Associated Audio, ISO/IEC JTC1/SC29/WG11 N0702(revised), Incorporating N702 Delta of Mar. 24, and Further Editorial Corrections May 10, 1994.

* cited by examiner

*Primary Examiner*—Howard Britton
(74) *Attorney, Agent, or Firm*—Skjerven Morrill MacPherson LLP

(57) ABSTRACT

A system and method for decoding and displaying a video bitstream representing video images and displaying the video images. The present invention discloses a split memory manager design which is particularly adapted to display MPEG-2 format video images. In addition, the present invention discloses a novel way of managing the video memory used in a video decode and display system. Finally, an intraframe video data compression system and method is disclosed to complement the disclosed video decoding and displaying system.

52 Claims, 17 Drawing Sheets

VIDEO MEMORY MANAGEMENT FOR MPEG VIDEO DECODE AND DISPLAY SYSTEM

BACKGROUND OF THE INVENTION

The present invention relates generally to video memory management in MPEG ("Moving Picture Experts Groups") decode and display system, and more particularly to reducing the size of video memory needed in a MPEG decode and display system for decoding and displaying video images.

In the late 1980s, a need arose to place motion video and its associated audio onto first generation CD-ROMs at 1.4 Mbits/s. For this purpose, in the late 1980s and early 1990s, the ISO ("International Organization for Standardization") MPEG committee developed digital compression standards for the video and two-channel stereo audio. The standard is known colloquially as MPEG-1 and officially as ISO 11172.

Following MPEG-1, the need arose to compress entertainment TV for such transmission media as satellite, cassette tape, over-the-air, and CATV. Thus, to have available digital compression methods for full-resolution Standard Definition TV (SDTV) pictures or High Definition TV (HDTV) pictures, ISO developed a second standard known colloquially as MPEG-2 and officially ISO 13818. The bitrate chosen for optimizing MPEG-2 was 4 Mbits/s and 9 Mbits/s for SDTV and about 20 Mbits/s for HDTV.

Neither the MPEG-1 nor the MPEG-2 standards prescribe which encoding methods to use, the encoding process, or details of encoders. These standards only specify formats for representing data input to the decoder, and a set of rules for interpreting these data. These formats for representing data are referred to as syntax and can be used to construct various kinds of valid data streams referred to as bitstreams. The rules for interpreting the data are called decoding semantics. An ordered set of decoding semantics is referred to as a decoding process.

The MPEG syntax supports different encoding methods that exploit both spatial redundancies and temporal redundancies. Spatial redundancies are exploited by using block-based Discrete Cosine Transform ("DCT") coding of 8×8 pixel blocks followed by quantization, zigzag scan, and variable length coding of runs of zero quantized indices and amplitudes of these indices. Quantization matrix allowing perceptually weighted quantization of DCT coefficients can be used to discard perceptually irrelevant information, thus increasing the coding efficiency further. On the other hand, temporal redundancies are exploited by using motion compensated prediction, forward prediction, backward prediction, and bidirectional prediction.

The MPEG provides two types of video data compression method: intraframe coding, and interframe coding.

The intraframe coding is for exploiting the spatial redundancies. Many of the interactive requirements can be satisfied by the intraframe coding alone. However, in some video signals with low bitrates, the image quality that can be achieved by intraframe coding alone is not sufficient.

Therefore, the temporal redundancy is exploited by MPEG algorithms which compute an interframe difference signal called the Prediction Error. In computing the prediction error, the technique of motion compensation is employed to correct the prediction for motion. As in H.261, the Macroblock (MB) approach is adopted for motion compensation in MPEG. In unidirectional motion estimation, called Forward Prediction, a Target MB in the picture to be encoded is matched with a set of displaced macroblocks of the same size in a past picture called the Reference picture. As in H.261, the Macroblock in the Reference picture that best matches the Target Macroblock is used as the Prediction MB. The prediction error is then computed as the difference between the Target Macroblock and the Prediction Macroblock.

I. PICTURE BUFFER SIZE (1) Two Reference Frames

In summary, MPEG-2 divides video pictures into three types of pictures (i.e. Intra "I", Predictive "P", & Bidirectionally Predictive "B"). By definition, all macroblocks within an I picture must be coded intra (like a baseline JPEG picture). Additionally, macroblocks within a P picture may either be coded as intra or non-intra. During the non-intra coding of a P picture, the P picture is temporally predicted from a previously reconstructed picture so that it is coded with respect to immediately previous I or P pictures. Finally, macroblocks within the B (i.e. bidirectionally predictive) picture can be independently selected as either intra, or non-intra such as forward predicted, backward predicted, or both forward and backward (Interpolated) predicted. During the non-intra coding of a B picture, the picture is coded with respect to the immediate previous I or P picture, as well as the immediate next I or P picture. In terms of coding order, P pictures are causal, whereas B pictures are noncausal and use two surrounding casually coded pictures for prediction. In terms of compression efficiency, I pictures are least efficient, P pictures are somewhat better, and B pictures are the most efficient.

All the macroblocks headers contain an element, called macroblock_type, which can flip these modes on and off like switches. The macroblock (or motion_type as in MPEG-2) type is possibly the single most powerful element in the whole of video syntax. Picture types (I, P, and B) merely enable macroblock modes by widening the scope of the semantics.

The sequence of pictures may consist of almost any pattern of I, P, and B pictures. It is common in industrial practice to have a fixed pattern (e.g. IBBPBBPBBPBBPBB), however, more advanced encoders will attempt to optimize the placement of the three picture types according to local sequence characteristics in the context of more global characteristics.

As explained above, since the decoder needs the two reference frames (i.e. 2 P frames; 1 P and 1 I frames; or 2 I frames) to reconstruct a B picture, the video decode and display system must allocate at least two frames of video memory to store the two reference frames.

(2) Two Half-Frames (I) Interlaced Video

In addition, MPEG-2 defines that a frame may be coded progressively or interlaced, signaled by the "progressive_frame" variable.

Progressive frames are a logic choice for video material which organized from film, where all "pixels" are integrated or captured at almost the same time instant. The optical image of a scene on the picture is scanned one line at a time from left to right and from top to bottom. The detail that can be represented in the vertical direction is limited by the number of scan lines. Thus, some of the detail in vertical resolution is lost as the result of raster scanning fall. Similarly, some of the detail in the horizontal direction is lost owing to sampling of each scan line.

The choice of scan lines involves tradeoff among contradictory requirements of bandwidth, flicker and resolution. Interlaced frames scanning tries to achieve these tradeoffs by using frames that are composed of two fields sampled at different times, with lines of the two fields interleaved, such that two consecutive lines of a frame belong to alternate fields. This represents a vertical-temporal tradeoff in spatial and temporal resolution.

For the interlaced pictures, MPEG-2 provides a choice of two "Picture Structures." "Field-pictures" consist of individual fields that are each divided into macroblocks and coded separately. With "Frame-pictures", on the other hand, each interlaced field pair is interleaved together into a frame that is then divided into macroblocks and coded. MPEG-2 requires interlaced video to be displayed as alternate top and bottom fields. However, within a frame either the top or bottom field is temporally coded first and sent as the first Field-picture of the frame. The choice of the frame structures is indicated by the one of the MPEG-2 parameters.

In a conventional decode and display system processing interlaced Frame-pictures, even though both the reconstructured data for the top field and the bottom field are generated by the decoder simultaneously, the bottom field is displayed only after the completion of the displaying of the top field, or vice versa. Because of this delay in displaying the bottom field, a one field (half frame) size buffer is required to store the bottom field for the delayed. Note that this additional video memory requirement of an additional one field (half frame) is on top of the abovementioned requirement of the two frames needed to store the two reference frames (i.e. I and/or P frames).

(ii) 3:2 Pulldown

The repeat-first-field was introduced in MPEG-2 to signal that a field or frame from the current frame is to be repeated for purposes of frame rate conversion (as in the 30 Hz display vs. 24 Hz coded example below). On average in a 24 frame/sec coded sequence, every other coded frame would signal the repeat-first-field flag. Thus the 24 frame/sec (or 48 field/sec) coded sequence would become a 30 frame/sec (60 field/sec) display sequence. This process has been known for decades as 3:2 pulldown. Most movies seen on NTSC displays since the advent of television have been displayed this way. In the MPEG-2 format, since the repeat-first-field flag is independently determined in every frame structured picture, the actual pattern can be irregular (it doesn't have to be every other frame literally).

For MPEG-2 video, the video display and the memory controller have to decide for themselves when to perform 3:2 pulldown by checking the flags coming with the decoded video data. MPEG-2 provides two flags (repeat-first-field, and top-field-first) which explicitly describe whether a frame or field is to be repeated. In progressive sequences, frames can be repeated 2 or 3 times. On the other hand, Simple and Main Profile is limited to repeated fields only. In addition, it is a general syntactic restriction that repeat-first-field can only be signaled (value==1) in a progressive frame structured picture.

For example, in the most common scenario, a film sequence will contain 24 frames every second. The frame_rate element in the sequence header will indicate 30 frames/sec, however. On average, every other coded frame will signal a repeat field (repeat-first-field==1) to pad the frame rate from 24 Hz to 30 Hz: (24 coded frames/sec)*(2 fields/coded frame)*(5 display fields/4 coded fields)=60 display fields/sec=30 display frames/sec.

For a system having the 3:2 pulldown capability, another extra one field (half frame) of the video memory is required to store the first displayed field for the later repeating purpose (according to the 3:2 pulldown protocol) because the first displayed field will be needed for display again after the second field is finished displaying. To illustrate this requirement: If the top field is displayed first during the decoding, then the bottom field will be displayed following the completion of the display of the top field. However, the top field will be needed again for display after the system finishes displaying the bottom field (i.e. 3:2 pulldown). Because the top field is needed for display in two different instances (i.e. before and after displaying the bottom field), another half frame (one field) of the video memory is needed for storing the top field. Together with the abovementioned two and a half frames required to store the two reference frames and the one half frame for displaying interlaced pictures, a total of 3 frames (two frames+one half frame+one half frame) of the video memory are needed for the conventional system to display MPEG-2 video pictures.

(iii) Still Frame

Some newly designed MPEG-2 video decode and display systems also allow the user to freeze the currently displaying frame. Under the "still frame" condition, the video decode and display system repeatedly displays the currently displaying picture until further instruction from the user. The need of the abovementioned two half-frames (i.e. for the displaying of interlaced picture and the 3:2 pulldown) is not required because no further decoding and 3:2 pulldown are needed during the suspension. However, if the frozen frame in display is a progressive B frame, an extra frame of video memory is needed to store the currently displaying B-frame because the entire B frame is needed to be stored in the video system. It is true that if the frozen frame is an I or P frame, no extra video memory is needed because these two reference frames are already stored in the video memory (as the forward prediction frame and the backward prediction frame). However, an extra frame of video memory is needed for the displaying of a B frame because the B frame is not usually stored in the video memory for reference. Therefore, in order to display an accurate image of a B frame picture, another full frame of the video memory is needed on top of the two frames required to store the reference frames.

II. PROBLEMS FACING THE CONVENTIONAL VIDEO DECODE AND DISPLAY SYSTEM

The MPEG-2 Main Profile and Main Level system is defined to have sampling limits at CCIR 601 parameters (720×480×30 Hz for NTSC or 720×576×24 Hz for PAL). The term "Profiles" is used to limit the syntax used in the MPEG (i.e. algorithms), and the term "Levels" is used to limit coding parameters (sample rates, frame dimensions, coded bitrates, etc.). Together, video Main Profile and Main Level normalizes complexity with feasible limits of 1994 VLSI technology yet still meet the needs of the majority of applications.

For a CCIR 601 rate video, the 3 frames needed for the PAL/SECAM decode and display system pushes the decoder video memory requirement past the normal 16-Mbits (2 Mbytes) threshold into the next level of memory design of 32-Mbits. This memory constraint is discussed in U.S. Pat. No. 5,646,693 issued to Cismas on Jul. 8, 1997, and assigned to the same assignee of the present application. The Cismas reference is hereby fully incorporated by reference. As it has been well documented in the art, increasing the video memory beyond 16-Mbits would add complexity in the memory controller design and also extra cost of another 16-Mbits video memory for manufacture.

Cismas discloses a system and method for decoding and displaying MPEG video pictures using a frame buffer whose size is less than the ordinary video memory requirement (i.e. 3 frames of memory). During the decoding and displaying, the Cismas system, instead of storing the full second field, stores only a portion of the second field when the first field is being displayed. When the second field is needed for display, the decoder decodes again the missing portion of the second field to generate the remaining data for the displaying of the remaining second field. By reusing the same memory locations allocated for the first displayed field again for displaying the second field, the decode and display system saves up to a half frame of memory (depending on the number of partitions). However, even though the Cismas system solves the problem of insufficient video memory during the display, Cismas system requires additional decoding power to decode the missing portion of the second field a second time. Therefore, a new video memory management system of being able to achieve the same goal of reducing the requirement of video memory while being able to eliminate the second decoding stage as Cismas is desired.

Additional objects and advantages of the invention will be set forth in the description which follows, and in part will be obvious from the description, or may be learned by practice of the invention. The objects and advantages of the present invention may be realized and obtained by means of the instrumentalities and combinations particularly pointed out in the claims.

SUMMARY OF THE INVENTION

The present invention is directed to an improved video memory control system for handling video memory used for the decoding and displaying a bitstream of compressed video data. Specifically, the present invention is directed to a video memory management system for receiving a bitstream of compressed video data, decoding the compressed video data, and displaying the image contained therein.

One aspect of the memory management system is to provide a modular memory management system or apparatus to handle the video memory management. More specifically, the video decode and display system of the present invention comprises a split memory manager having two separate memory managers. Each of these memory manager handles specific memory managing functions. By dividing the memory managing functions among different memory managers, the decoding and displaying of the video data can be performed more efficiently.

Another aspect of the present invention is to provide a novel method of processing and handling the video memory, which thereby provides an efficient way of handling the MPEG-2 data streams. Particularly, a segmented reusable video memory management system is disclosed.

Another aspect of the present invention is to provide an intraframe video data compression system capable of further reducing the size of the video memory needed for the video decode and display system.

BRIEF DESCRIPTION OF THE DRAWINGS

The accompanying drawings, which are incorporated in and constitute a part of the specification, schematically illustrate preferred embodiments of the invention and, together with the general description given above and the detailed description of the preferred embodiments given below, serve to explain the principles of the invention.

DESCRIPTION OF THE PREFERRED EMBODIMENT

The present invention will be described in terms of several preferred embodiments. The preferred embodiments are an apparatus and method for handling and processing video data. The following three aspects of the present invention will be discussed in detail: (1) Split Video Memory Manager; (2) Segmented Reusable Memory Design (or named by the inventors as "Rolling Memory Design"); and (3) Simple Fixed Low Bitrate Auxiliary Compression Technique without Considering the Methods and Usages (or named by the inventors as "FlexiRam"). All of these three aspects of the present invention are disclosed for the efficient handling of the video memory data and can be implemented in a single video decode and display system.

1. SPLIT VIDEO MEMORY MANAGER

Figure 1:
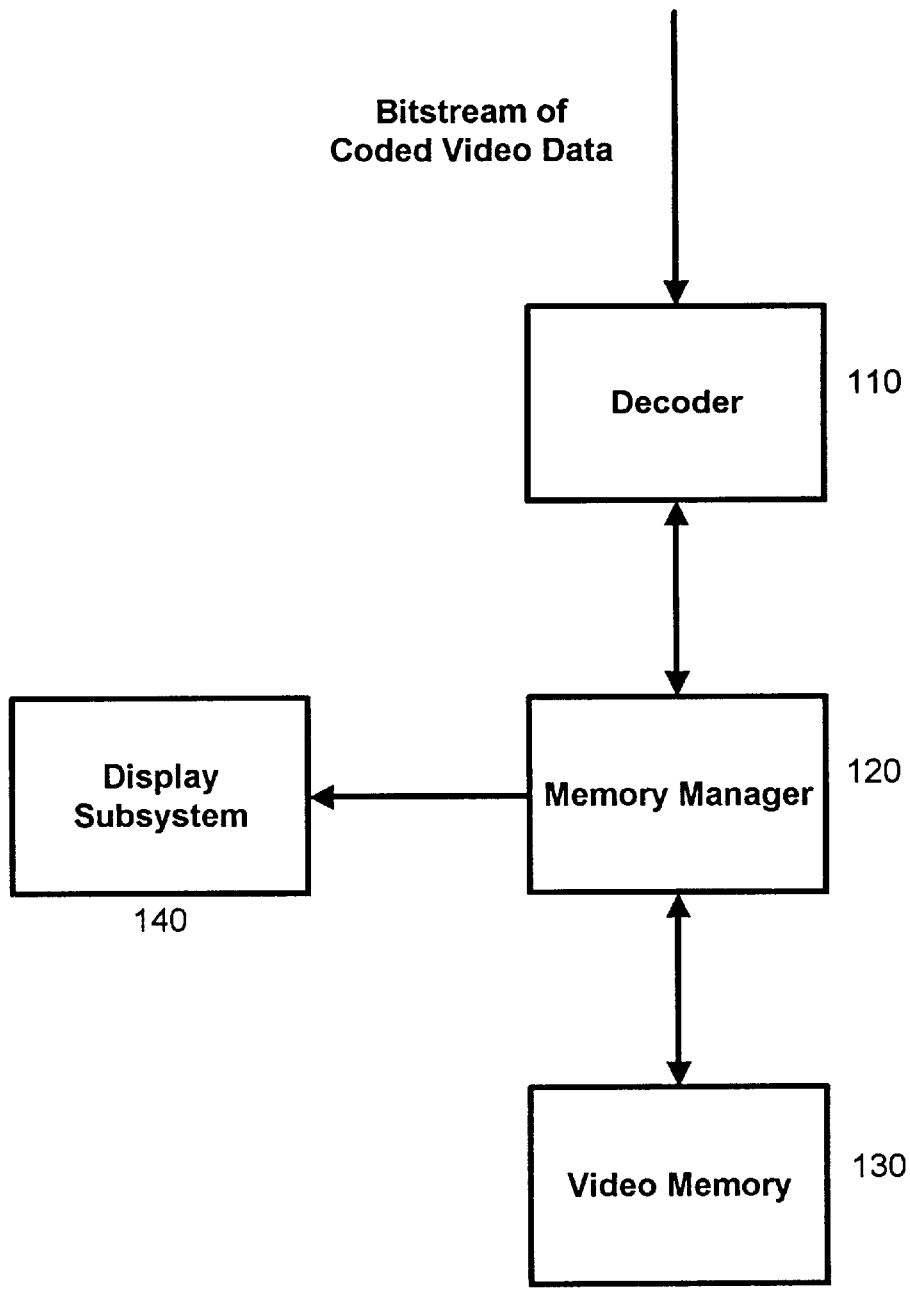
FIG. 1 shows a conventional video decode and display system.

FIG. 1 shows a convention video decode and display system comprising, a decoder 110, a memory manager 120, a video memory 130, and a display subsystem 140. A continuous bitstream of coded video data is provided to the decoder 110 for decoding and displaying. The continuous bitstream of video data is provided in a constant or a variable bitrate, depending on the overall system design. The decoder 110 decompresses the bitstream and then provides the decompressed data to the memory manager 120. The memory manager 120 is responsible for storing the decompressed video data in the video memory 130 and providing the video data for the display subsystem 140.

The video memory 130 serves basically two main functions: First, it acts as a video data buffer to buffer the processing speed different between the decoding of the incoming bitstream of video data and the displaying of the decoded video images. To prevent any interruption in displaying the video images, the decoder 110 is generally required to decompress video data faster than the need from the displaying subsystem 140. Secondly, the video memory 130 is needed to store and provide the reference frames data (i.e. I and P frames) for the decoder 110 to reconstruct the video images from the incoming bitstream of data. Therefore, as indicated in FIG. 1, the data bus between the decoder 110 and the memory manager 120 is bidirectional so that the decompressed data is flowing to and from the memory manager 120.

Figure 2:
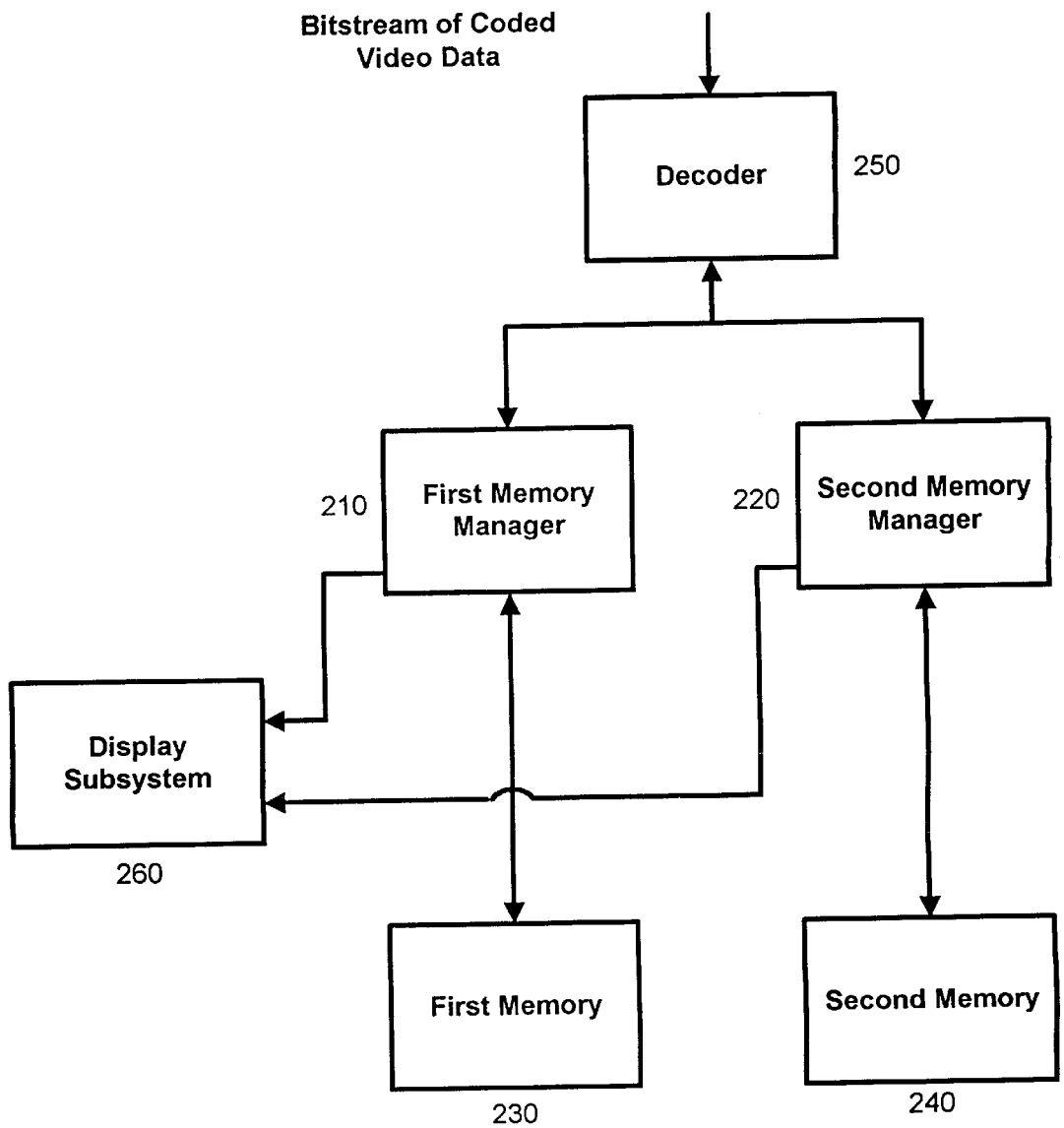
FIG. 2 shows a preferred embodiment of the split memory manager design of the present invention.

FIG. 2 illustrates a novel split memory manager design disclosed by the present invention. Instead of the conventional single memory manager design as shown in FIG. 1, the memory manager of the present invention comprises two separate memory managers: first memory manager 210 and second memory manager 220. Each of the memory managers is coupled to a video memory (i.e. first memory 230 and second memory 240).

As discussed in the previous paragraphs, there are basically two groups of video data stored in the video memory: reference frames data (i.e. I and P frames); and bidirectional frames data (i.e. B frame). Because these two groups of video data are processed differently in both the decoding and displaying, the handling of the video memory between these two groups of video data are quite different.

In a preferred embodiment of the present invention, the first memory manager 210 and the coupling first memory 230 is assigned to handle and store the reference frames (i.e. I and P frames) data, whereas the second memory manager 220 and the coupling second memory 240 is assigned to handle and store the bidirectional frames (i.e. B frames) data. By splitting the video memory controller into two separate and distinct memory controllers, each of the two controllers can be specifically designed to implement the most efficient memory management and/or compression methods to handle each kind of video data. By splitting the conventional memory manager into two separate managers, the present invention provides unsurpassed advantages over the conventional video decode and display system of having a simpler system design while being able to handle the video data more efficiently.

For example, in the video memory management system disclosed by cismas, the memory management method is directed to the B frames. In a preferred embodiment using the Split Memory Manager design, it can be designed that only the second memory manager 220 or 320 and the accompanying second memory 240 or 340 implement the Cismas memory management technique; whereas the first memory manager 210 or 310 and the accompanying first memory 230 or 330 performs the conventional video memory management functions. Therefore, the present invention's ability to customize a specific video memory management technique for each kind of video data provides the video system designer with great design flexibility over the conventional design.

Furthermore, in another preferred embodiment, the present invention comprises three memory managers. The first memory manager handles I frames. The second manager handles P frames. And the third memory manager handles B frames only.

In another preferred embodiment, the present invention comprises three memory managers. Each of the three memory managers handles one of the three color components (e.g. Y, U, and V).

In a further preferred embodiment of a video decode and display system having a plurality of memory managers, each of the memory managers can handle a different combination of the types (e.g. color components) and/or groups (e.g. reference frames or bidirectional frames) of the video data. For example, in a preferred embodiment, a video decode and display system comprises a first memory manager for handling the Y chroma component for I pictures, a second memory manager for handling the U and V chroma components for B pictures, a third memory manager for handling the U and V chroma for I and P pictures, and a fourth memory manager for handling the remaining video data. Each of the four memory managers can utilize a different memory management technique.

The design flexibility provided by the split memory manager design of the present invention is almost unlimited so that each memory manager can be customized to fit a specific kind or definition of the video data.

Figure 3:
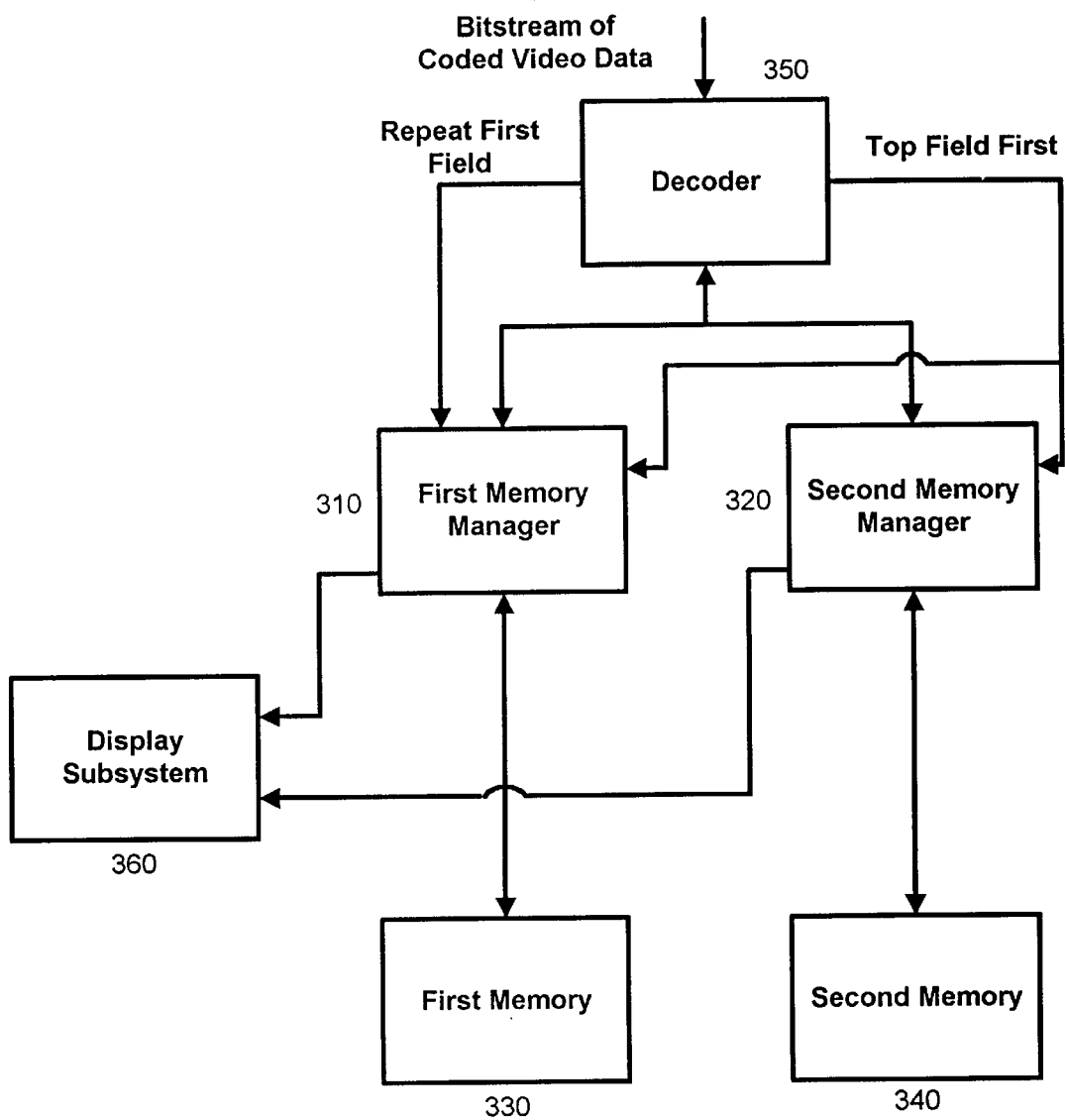
FIG. 3 shows another preferred embodiment of the split memory manager design of the present invention.

FIG. 3 shows another preferred embodiment of the present invention. Under the definition of the MPEG-2's Main Profile Main Level, the repeat-first-field is not allowed for the B frames for the PAL standard. Therefore, in the preferred embodiment designed for the MPEG-2 Main Profile Main Level PAL system, the repeat-first-field is not necessary to be provided to the second memory manager 320 because the second memory manager 320 processes only the B frame pictures. However, the top-field-first signal is still required for both the first memory manager 310 and the second memory manager 320 for handling interlaced pictures.

2. SEGMENTED REUSABLE VIDEO MEMORY DESIGN

Another aspect of the present invention is directed to a method of handling video memory allocation for a video decode and display system capable of handling both Field-pictures and Frame-pictures.

As explained previously, MPEG-2 provides a choice of two Picture Structures for interlaced pictures. Field-pictures consists of individual fields that are each divided into macroblocks and coded separately. With Frame-pictures, on the other hand, each interlaced field pair is interleaved together into a frame that is then divided into macroblocks and coded. MPEG-2 requires interlaced video to be displayed as alternate top and bottom fields. However, within a frame either the top or bottom field can be temporally coded first and sent as the first Field-picture of the frame according to a predefined definition. Because of the difference in sequence of the decoded data for the two Picture Structures, the writing and reading of the video data defined by these two formats is performed in two different orders.

Figure 4:
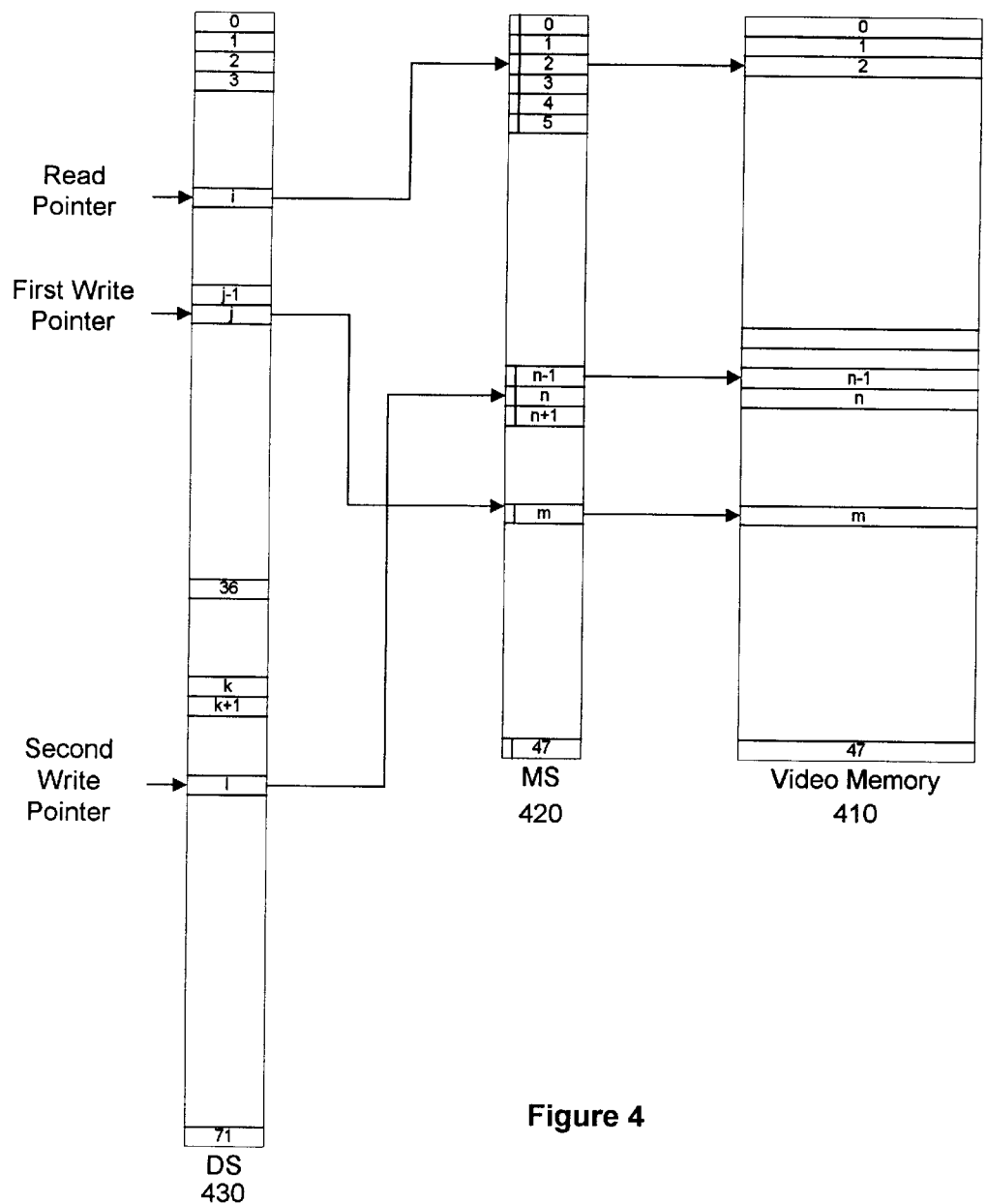
FIG. 4 shows the method of indirectly addressing a video memory using a display segment list and a memory segment list.

FIG. 4 illustrates a preferred embodiment of the present invention. As shown in the figure, the video memory 410 is partitioned into a plurality of memory segments. Each of the memory segment is able to store 8 consecutive lines of video data of one of the two fields. The memory manager creates and maintains two lists, MS (Memory Segments) 420 and DS (Display Segments) 430. Each of the memory segments is indirectly addressed by an entry of the Display Segment list 430 through an entry of the Memory Segment list 420. The MS list 420 has the same number of entries as the video memory segments, and each entry of the MS list corresponds to one memory segment. In a preferred embodiment, the MS list 420 has 48 entries for addressing 48 memory segments in the video memory 410. For the case of PAL, 48 memory segments in video memory corresponds to ⅔ of a frame. Each entry of the MS list 420 includes a 20-bits address defining the first cell address of the memory segment in the video memory 410. These addresses can be either static or dynamic, depending on the system design. For example, in a dedicated system specifically designed for decoding and displaying MPEG-2 video data, the addresses are preferably static and not dynamic in order to reduce system overhead. However, in a multi-purposes digital decode and display system such as system capable of displaying both MPEG-1 and MPEG-2 video data, these addresses are preferably dynamically maintained in order to accommodate different video memory management methods.

In a preferred embodiment as shown in FIG. 4, the DS list 430 maps the video memory 410 to the display screen. The display screen is logically divided into multiple segments, and each entry of the DS list 430 corresponds to one segment of the displaying screen. In the preferred embodiment, the DS list 430 includes 72 entries, one for each display segment. The number 72 is chosen because for the PAL format, 576 lines are displayed and each segment contains 8 lines of video data. Therefore, the number 72=576/8 is picked.

Figure 5:
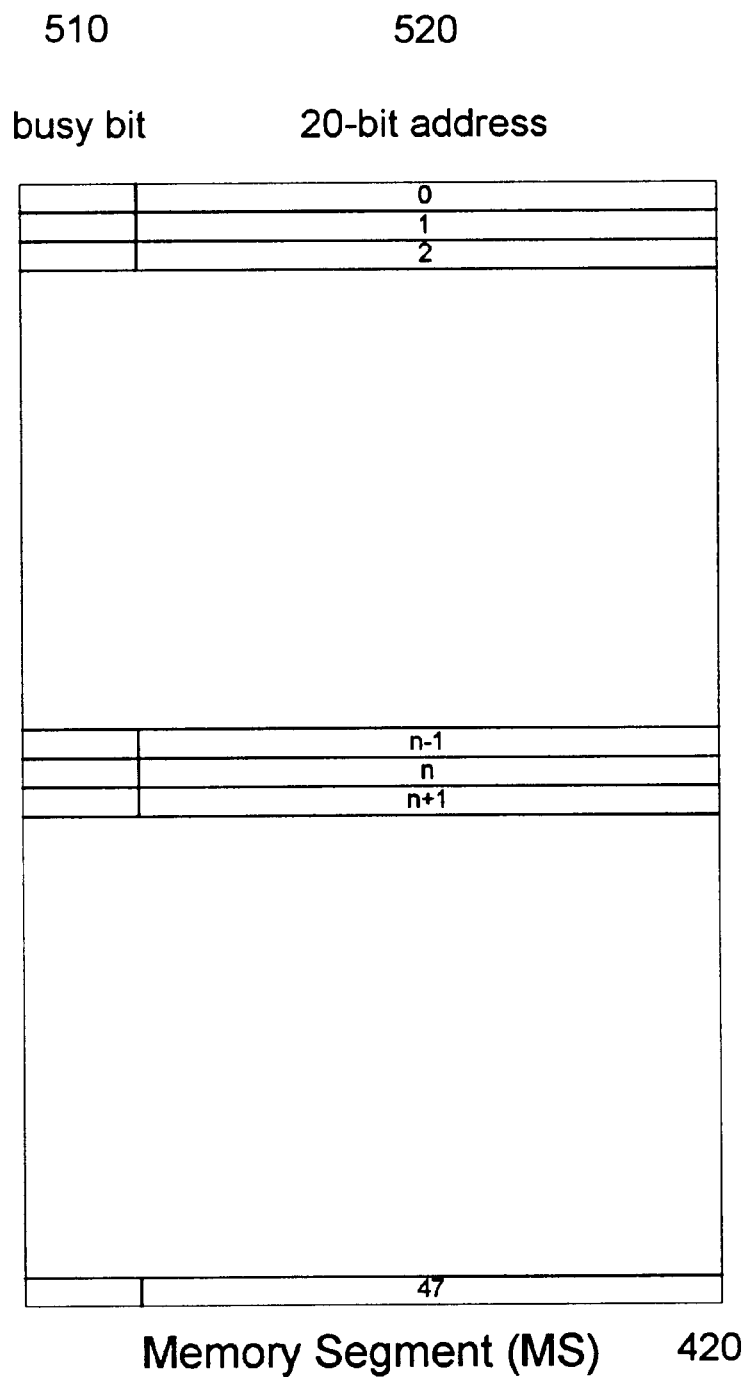
FIG. 5 shows the details of the memory segment list.
Figure 7:
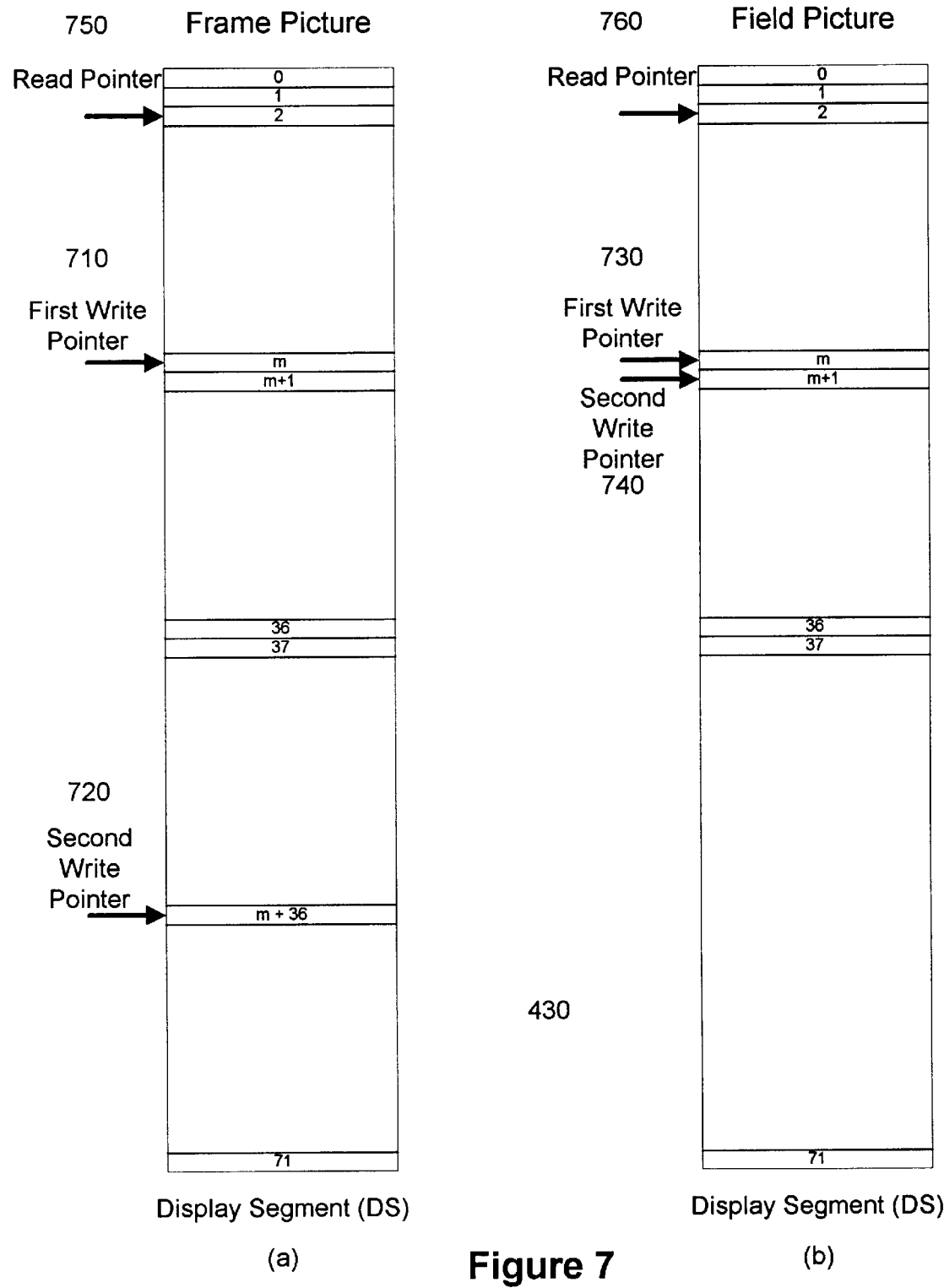
FIG. 7 shows the positioning of the two write pointers and the read pointer on the display segment list for (a) a Frame-picture format and (b) a Field-picture format.

As shown in FIGS. 4 and 5, each entry of the MS list 420 includes one additional busy bit 510 ("busy bit") to indicate whether the particular memory segment of the video memory is busy or not. Specifically, a memory segment is indicated as busy if it was written to and has not been displayed. Similarly, a not busy memory segment means that the memory segment has been displayed and no new data is contained therein. The use of the busy bit 510 is very important for the present invention because the switching of the busy bits 510 on each of the entries in the MS list 420 can be characterized as defining a logical sliding window in the video memory 410. By setting the busy bits 510 "on" and "off" when the data is written to and read from the video memory segments, the logical sliding window is defined as all the memory segments with the corresponding entries in the MS list with busy bits "on." In addition, the logical sliding window is also maintained by the incrementing and updating of two DS write pointers (i.e. 710 and 720, OR 730 and 740) and the read pointer (i.e. 750 OR 760) as shown in FIG. 7.

It should be pointed out that even though the physical locations of the memory segments in the video memory 410 and the entries in the MS list 420 are not assigned contiguously as in the entries in the DS list 430, the logical sliding window is defined by contiguous entries within the DS list 430. The logical sliding window expands in size after more decoded data are stored in the memory segments in the video memory 410, whereas the size is decreased after decoded data are read from the memory segments in the video memory 410. In addition, the logical sliding window shifts in location (i.e. downwardly in the DS list 430) when the video data is read and written from and to the video memory. The key concept of the present invention is the ability to define a logically contiguous memory space corresponding to a portion of the display screen that the corresponding decoded video data are currently written to video memory and has not been displayed, even though the video data might be randomly stored in the physical video memory. The advantage of the present invention is that the size of the physical video memory can be less than a full picture. Theoretically, the physical memory size can be as little as half of the size needed to store a full picture (i.e. one half of a frame).

FIG. 4 illustrates the indirect addressing scheme used by the preferred embodiment of the present invention. Each entry of the DS list 430 stores an index pointing to an entry of the MS list 420, whereby each entry of the MS list 420 stores an address of a memory segment of the video memory 410.

Figure 6:
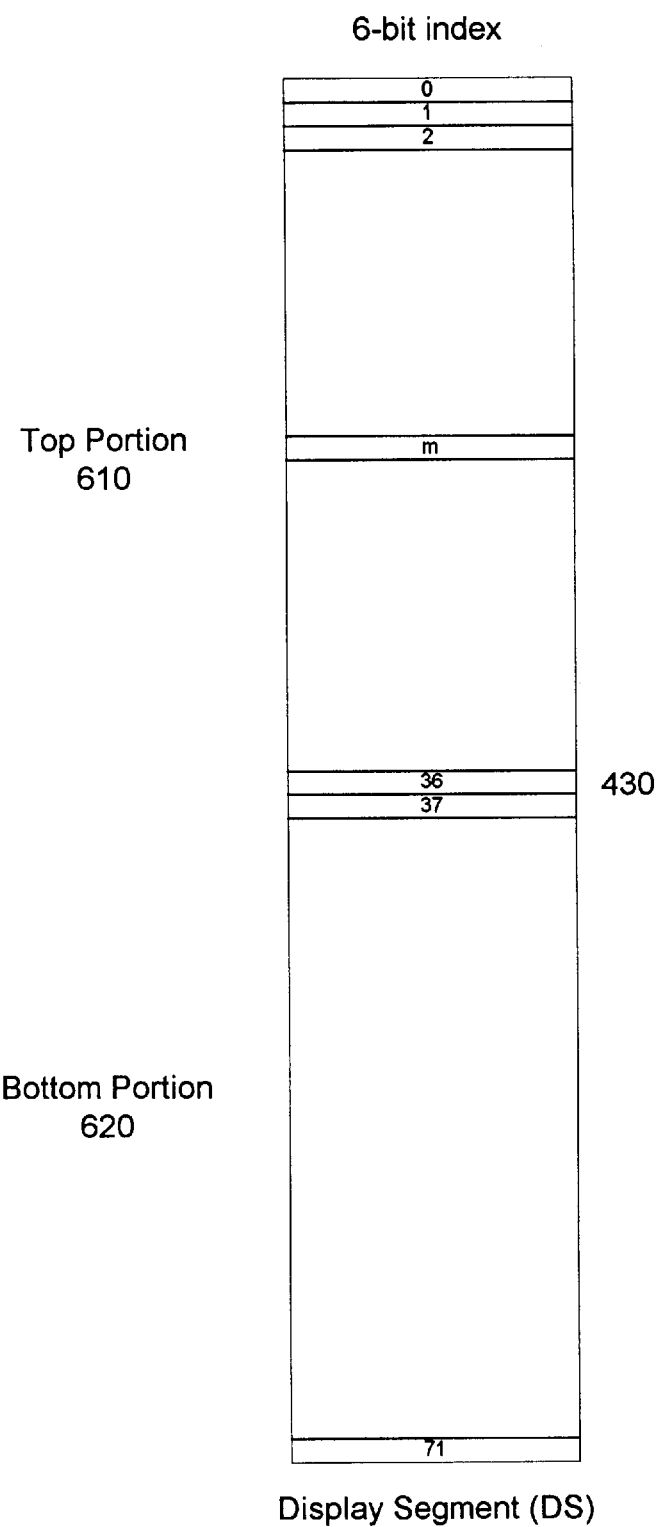
FIG. 6 shows the details of the display segment list.

In a preferred embodiment, the video decode and display system of the present invention handles interlaced pictures in both the Frame-picture format and Field-picture format. Therefore, as shown in FIG. 6, the DS list 430 is logically partitioned into two portions: a top portion 610 corresponding to the top field, and a bottom portion 620 corresponding to the bottom field. Entries indexed 0 to 35 belong to the top field and entries indexed 36 to 71 belong to the bottom field. To match the DS list 430 to the corresponding video memory segment 420, each entry of the DS list 430 includes a 6 bits index (0 to 47) into the MS list 420. Thereby, each of the entry of the DS list 430 refers to an entries of the MS list 420 and indirectly addressing one segment of the video memory (see FIG. 4).

As shown in FIG. 7, in the preferred embodiment, three pointers are maintained for the DS list 430: one read pointer for the reading and displaying (i.e. 750 or 760), and two write pointers for the video memory writing (i.e. 710,720 or 730,740).

For the Field-pictures and Frame-pictures, these three DS pointers are assigned in different positions.

FIG. 7(a) shows the positions of these three pointers when the video system is handling a Frame-pictures. To handle the bitstream of video data for Frame-pictures which the data is decoded interleavedly between two fields, the two write pointers 710,720 are set to pointing at two DS entries having an interval of 36 between them so that each of the two write pointers is pointing at an entry in the same offset location in different fields (i.e. the top field, and the bottom field). Further, the read pointer 750 is pointing to an entry of the DS list 430 to be displayed next. To accommodate both the top field and the bottom field of a Frame-picture, the logical sliding window is further comprises of a logical top window and a logical bottom window. The logical top window defines a sliding window in the top field which is indicated by contiguous entries in the top portion of the DS list indirectly addressing to memory segments in the video memory which were written to and has not been displayed. Similarly, the logical bottom window defines a sliding window in the bottom field which is indicated by contiguous entries in the bottom portion of the DS list indirectly addressing to memory segments in the video memory which were written to and has not been displayed.

FIG. 7(b) shows the positions of these pointers when the video decode and display system is handling Field-pictures. Because the video data of Field-pictures are decoded and provided by the decoder in sequential order, the two write pointers 730,740 are set to have a fixed interval of 1 between them. Further, the read pointer 760 is pointing to an entry of the DS list 430 to be displayed next. In the Field-pictures the video data are decoded and provided in sequential order, there is no need to split the logical sliding window further to the logical top and bottom windows as in the Frame-pictures. Therefore, a logical sliding window as discussed in the previous paragraphs is maintained.

Figure 8:
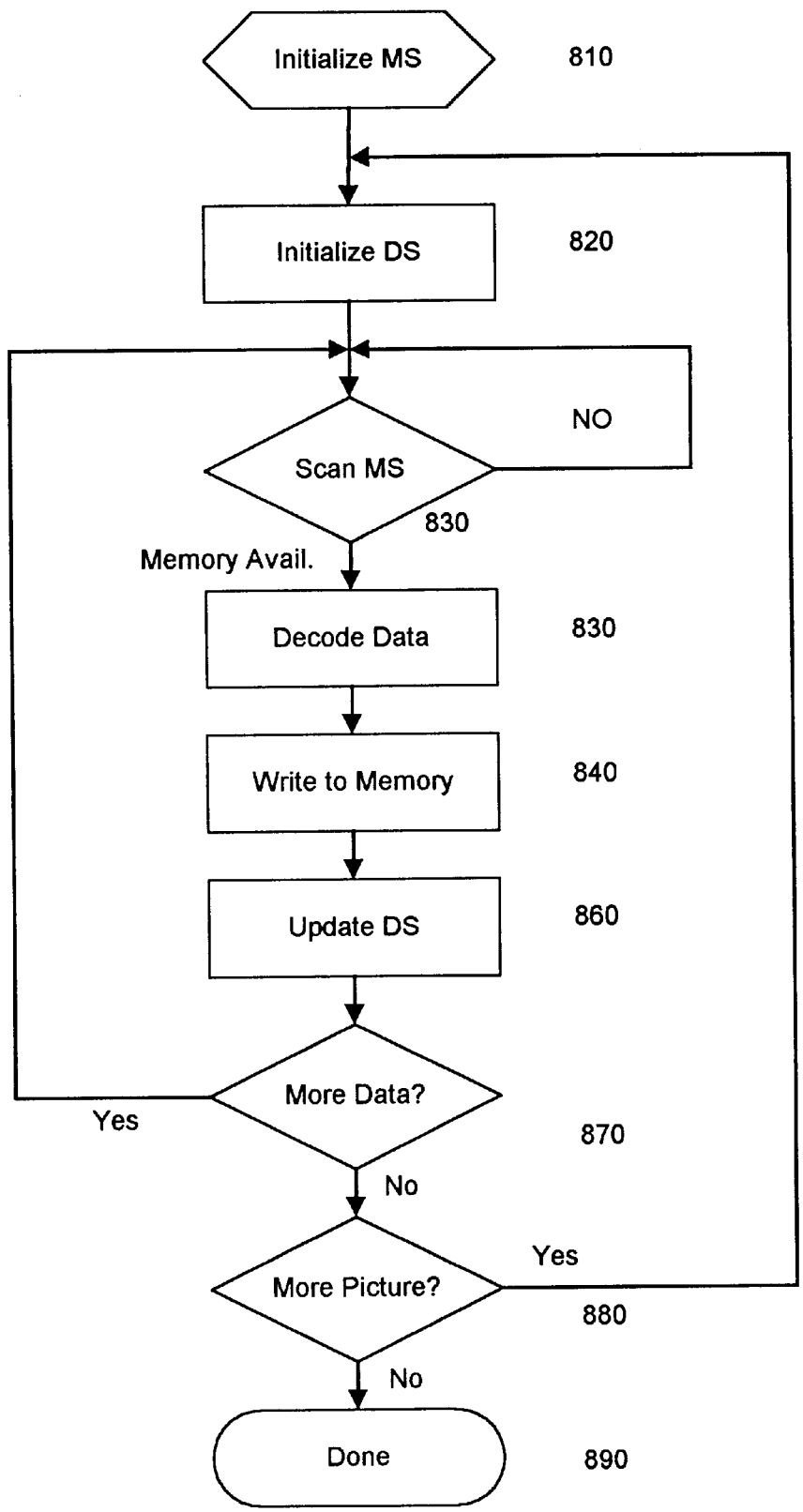
FIG. 8 is a block diagram showing the details of the segmented reusable video memory design (or named as Rolling Memory Design by the inventors).

FIG. 8 illustrates a flow diagram for the present invention.

First, during the initialization of the video decode and display system, all the busy bits of the MS entries are initialized to NOT busy (i.e. setting all the busy bits of the MS entries to a logic zero) by the memory manager (step 810).

Figure 9:
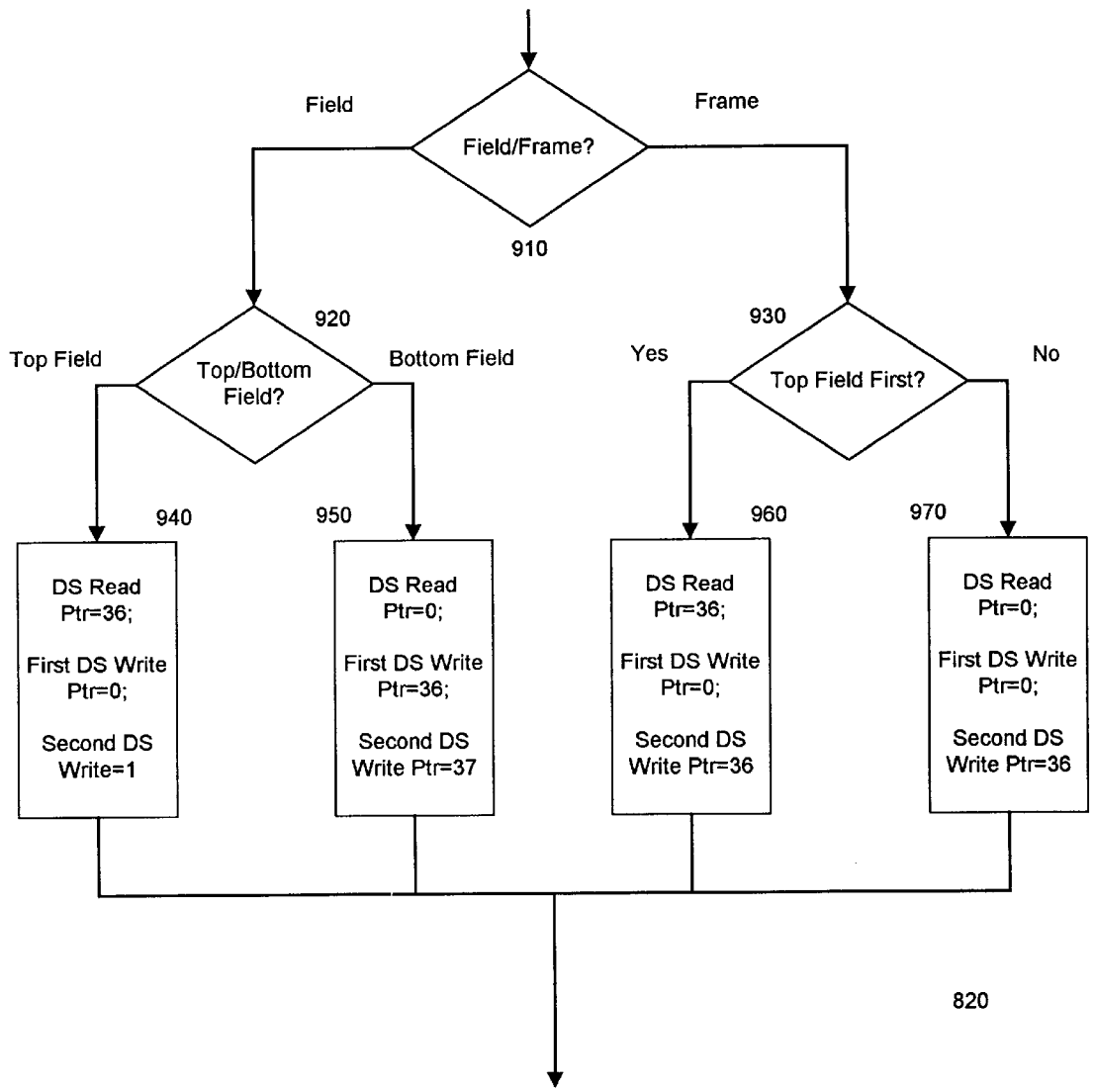
FIG. 9 shows the details of the initialization of the display segment list for each picture.

When the memory manager detects a new picture in the incoming stream of coded video data, the memory manager initializes the DS list 430 (step 820) as shown in FIG. 9.

FIG. 9 details the steps of initializing the DS list 430 for each picture (step 820). First, the memory controller checks the format of the picture in the incoming bitstream and determine whether the picture is a Field-picture or a Frame-picture by checking the alue of the Picture_structure parameter (step 910).

If the video data is in the Frame-pictures format, then the memory controller checks the variable top-field-first to determine whether the flag is set (step 930). If a top field is to be decoded first, the DS read pointer 750 is initialized to 36, and the first DS write pointer 710 is set to 0, and the second DS write pointer 720 is set to 36 (step 960). On the other hand, if the bottom field is to be decoded first, the DS read pointer 750 is set to 0, the first DS write pointer 710 is set to 0, and the second DS write pointer 720 is set to 36 (step 970).

As shown in FIG. 9, if the video data is in the Field-pictures format, the memory controller checks the Picture_structure parameter to determine whether the incoming video data is a top field picture or a bottom field picture (step 920). If a top field is to be decoded, the three DS pointers are set as follows: DS read pointer 760 is set to 36, the first DS write pointer 730 is set to 0, and the second DS write pointer 740 is set to 1 (step 940). On the other hand, if the bottom field is to be decoded, the DS read pointer 760 is set to 0, the first DS write pointer 730 is set to 36, and the second DS write pointer 740 is set to 37 (step 950).

As shown in FIG. 8, after the DS list is initialized, the memory manager scans the MS list 420 for available space in the video memory 410 by checking the busy bits 510 of the MS list 420 entries (step 830). The memory manager scans the MS list 420, in order, from index 0 to index 47, to find the first two entries with the busy bits 510 not set. If there are no such "not busy" segments, or only one such segment, the decoding is stalled until the condition is fulfilled. The decoder is thereby entered into a waiting stage waiting for the two "not busy" video memory segments. The memory manager will release the memory segments to store the newly decoded video data, when the data in the video memory segments is read and displayed, by setting the corresponding busy bits 510 of the memory segments to a logic zero.

When two not busy memory segments are found, the MS index 420 (e.g. 0,1,2, . . . or 47) of the first available memory segment is written to the DS list 430 entry pointed at by the first DS write pointer (i.e. 710 or 730), and the MS index of the second available memory segment is written to the DS entry pointed at by the second DS write pointer (i.e. 720 or 740) so that the two DS write pointers are indirectly addressing the two "not busy" memory segments in the video memory 410.

After the DS entry is updated, the decoder decodes a new macroblock row containing 16 lines of video data (step 830).

Figure 10:
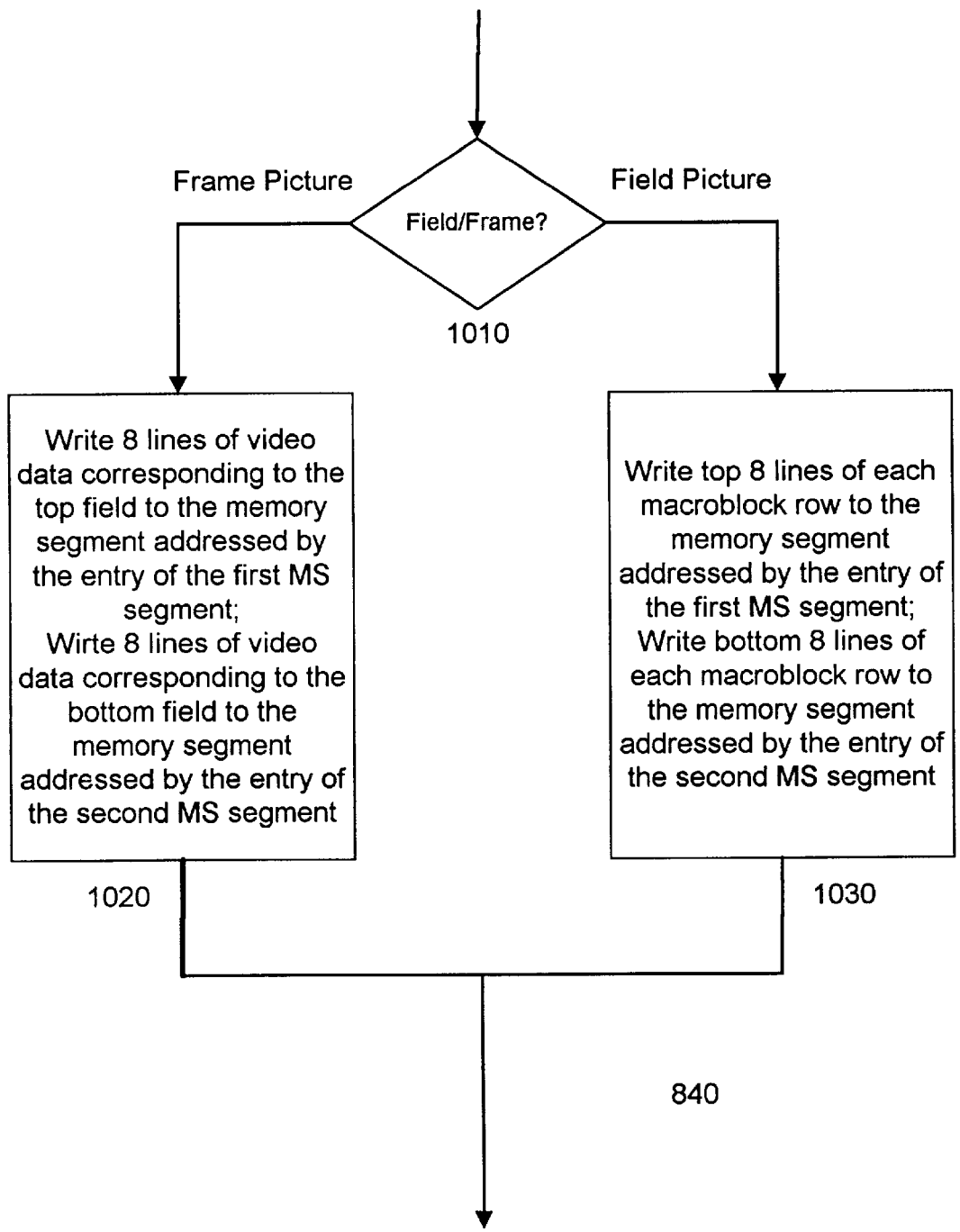
FIG. 10 shows the writing of the decoded video data of each macroblock row to the video memory.

After the macroblock row of video data is decoded, the memory manager saves the decoded video data to the video memory in step 840. FIG. 10 shows the details of step 840.

As shown in FIG. 10, if the picture is a Field-picture, the memory manager writes the video data of the top 8 lines of each macroblock row to the memory segment addressed by the entry of the MS segment indirectly addressed by the first DS write pointer 730 (step 1030). Then the memory manager writes the video data of the bottom 8 lines of each macroblock row to the memory segment addressed by the entry of the MS segment indirectly addressed by the second DS write pointer 740 (step 1030).

On the other hand, if the picture is a Frame-pictures, after the decoder decodes 16 lines of video data (i.e. one macroblock row) of the incoming bitstream, the memory manager writes the 8 lines of the video data corresponding to the top field of the currently decoding frame to the memory segment addressed by the entry of the first MS segment indirectly addressed by the first DS write pointer 710. Then the memory manager writes the 8 lines of the video data corresponding to the bottom field of the currently decoding frame to the memory segment addressed by the entry of the second MS segment indirectly addressed by the second DS write pointer 720 (step 1020).

Figure 11:
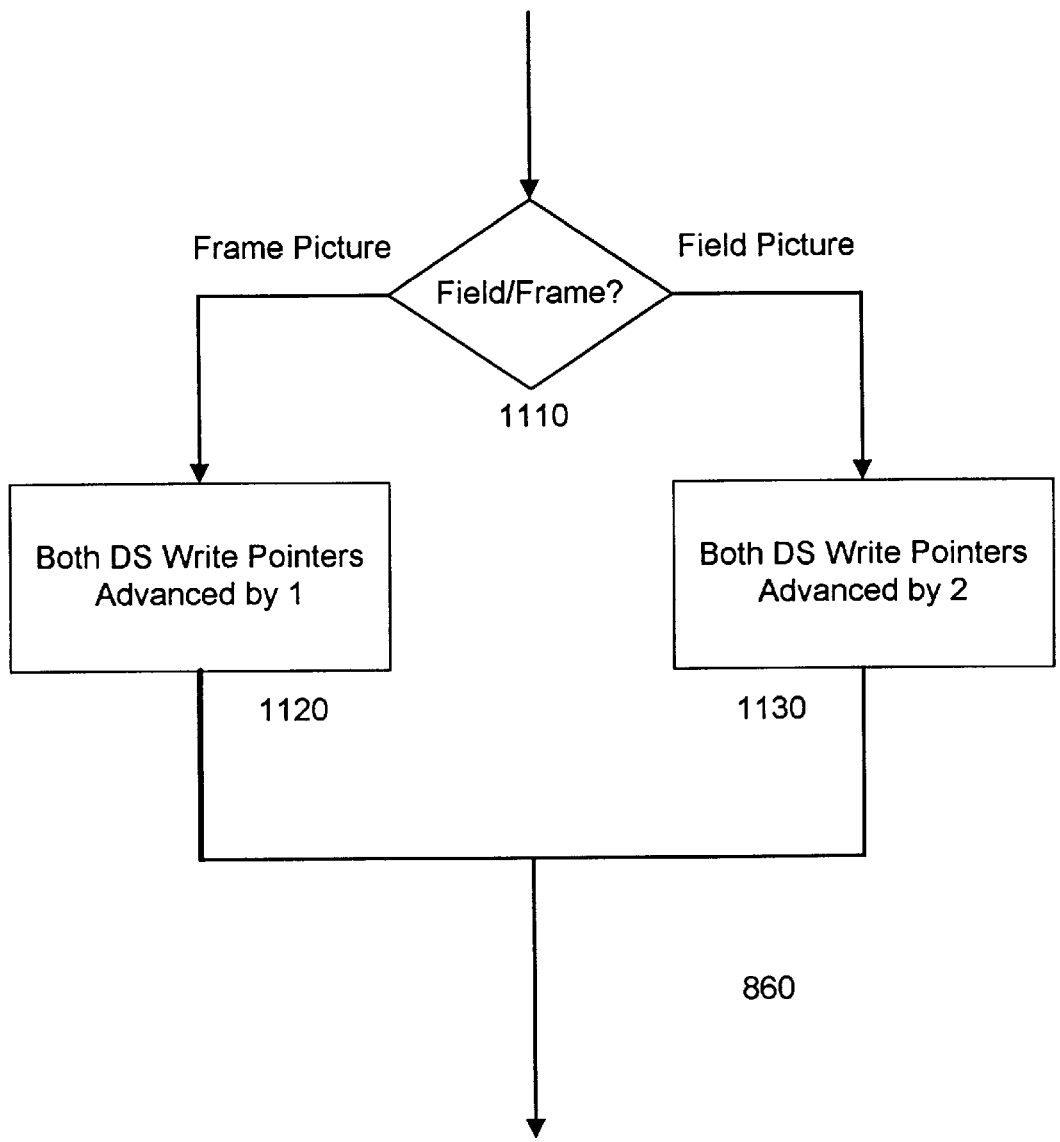
FIG. 11 shows the details of the updating of the display segment list.

As shown in FIG. 8, subsequent to the writing of the video data to the corresponding memory segment, the DS pointers (i.e. 710,720,&750 or 730,740,&760) are then updated (step 860) by the steps as shown in FIG. 11.

FIG. 11 shows the details of the DS pointers (i.e. 710, 720,&750 or 730,740&760) updating operations (step 860). The memory manager first checks whether the video data is in the Field-picture format or Frame-picture format (step 1110), then the memory manager updates the two DS write pointers accordingly (steps 1120 & 1130).

If the video data is in the Frame-pictures format, both two DS write pointers 710,720 are advanced by 1 (step 1120). On the other hand, if the video data is in the Field-pictures format, both two DS write pointers 730,740 are advanced by 2 (step 1130).

After the DS pointers are updated, the memory manager checks whether there is any more incoming video data for the current picture. If there is still incoming video bitstream, the operation goes back to the MS list scanning stage as shown in FIG. 8 (step 870).

If the incoming bitstream for the current picture is concluded, then the video system checks whether there is any more pictures for further decoded and displayed (step 880). If there are more pictures incoming for decoding and displaying, the whole operation returns to step 820. The entire operation is completed if there are not any more incoming pictures for displaying (step 890).

When the system requires additional video data for display, the next 8 lines of data is retrieved from the memory segment of the video memory 410 using the MS index addressed by the DS read pointer (i.e. 750 or 760). The address stored in the MS list entry is used to locate the memory segment to be displayed next from the video memory 410. After the specific memory segment is read for display, the busy bit 510 of that MS entry 420 is set to not busy and the DS read pointer is then incremented by 1 (modulo 72). The DS read pointer is reset to the "0" position after the pointer reaches 71.

In one embodiment of the present invention, if the memory controller does not possess sufficient speed to process the abovementioned "indirect addressing" scheme, the entries of the DS list 430 can then be increased from 6 bits to 26 bits so that when the address of the memory segment is selected in the MS entry, it is copied to the DS entry together with the MS list 420 index. By writing the addresses of the memory segments along with the MS list 420 entries to the DS entries, the extra steps of addressing and retrieving data from the MS list 420 can be avoided.

3. FLEXIRAM DESIGN

Another aspect of the present invention is directed to an intraframe video memory compression/decompression method.

In the present invention, the video data is compressed, lossy or lossless, before it is stored in the video memory, and the compressed data will be decompressed when it reads out from the video memory. This video data compression and decompression apparatus is named by the inventors as "FlexiRam."

Figure 12:
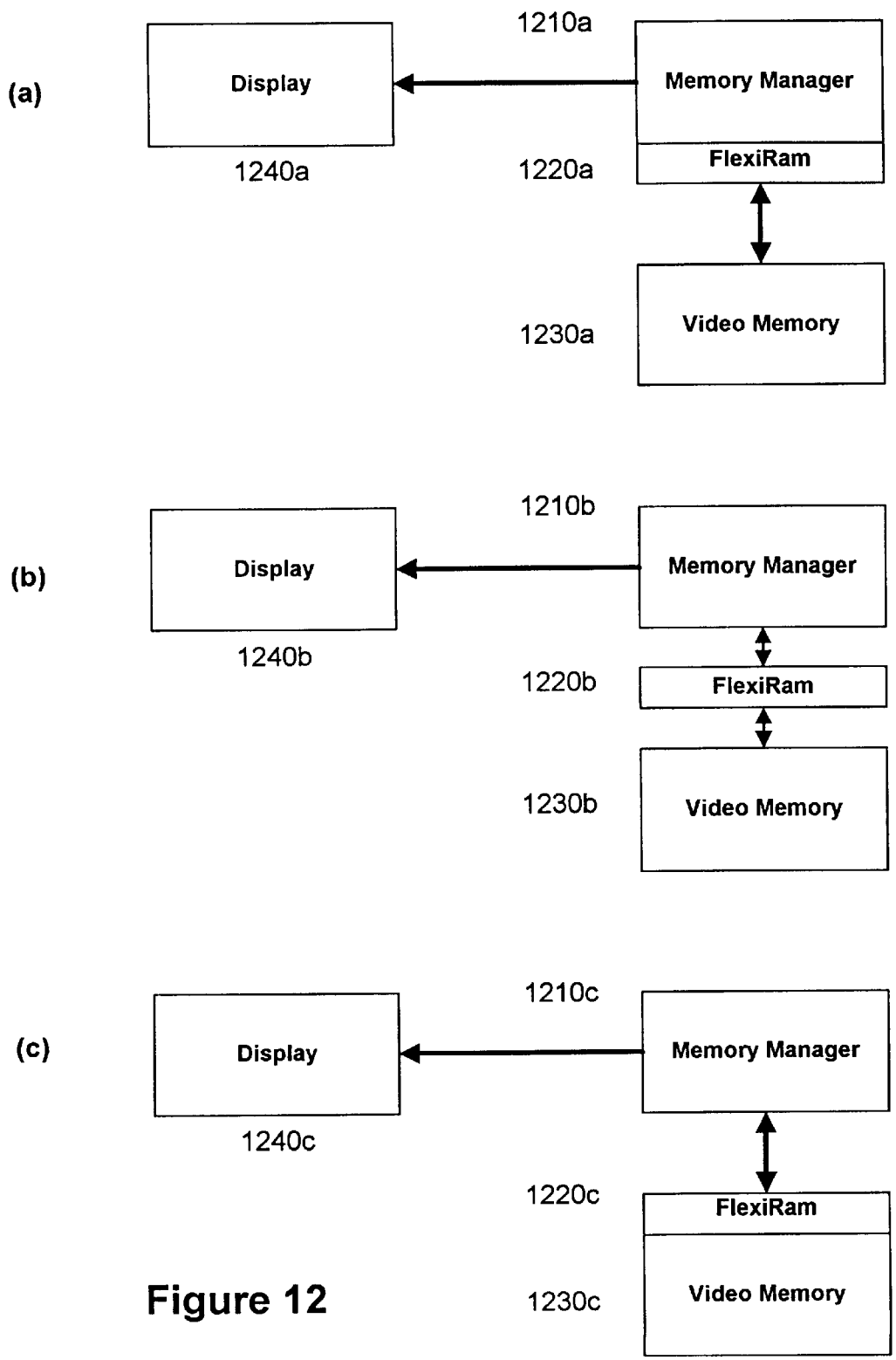
FIG. 12 shows three preferred embodiments of the FlexiRam design.

FIG. 12 shows three different embodiments of the present invention.

In a preferred embodiment as shown in FIG. 12(a), the FlexiRam 1220a of the present invention is incorporated into the memory manager 1210a so that all the compression and decompression of the video data are performed within the memory manager 1210a. The advantages of this embodiment are that there is no special hardware requirement for the video memory 1230a, and both the compression and decompression of the video data are transparent to the video memory 1230a.

FIG. 12(b) shows another preferred embodiment of the present invention, the FlexiRam 1220b is separated from both the memory manager 1210b and the video memory 1230b. The advantage of this embodiment is being able to implement the present invention without substantial modifications to the entire video decode and display system.

FIG. 12(c) shows another embodiment of the present invention, the FlexiRam 1220c is incorporated into the video memory 1230c. The advantage of this embodiment is the entire operation of the data compression and decompression is transparent to the memory manager 1210c and no overhead is added to the memory manager 1210c.

It should be noted that the present invention works on all picture types (I, P and B) and does not limit itself into any type of pictures. Therefore, if desired, the present invention can be implemented with either (a) the second memory manager 240; or (b) both of the first memory manager 230 and the second memory manager 240 in the Split Memory Manager design (see FIG. 2).

Figure 13:
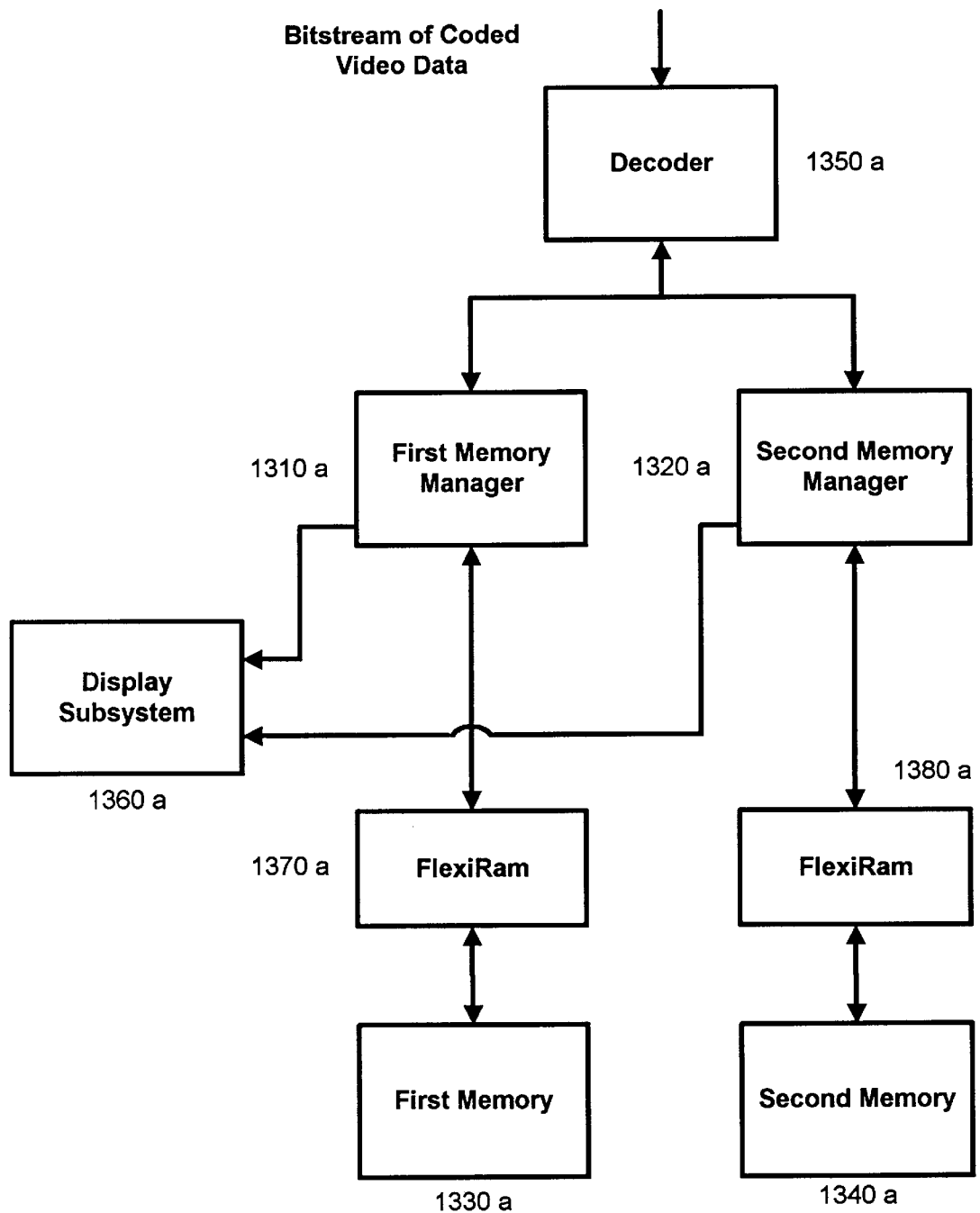
FIGS. 13a, 13b and 13c show another three preferred embodiments of the FlexiRam design.
Figure 13:
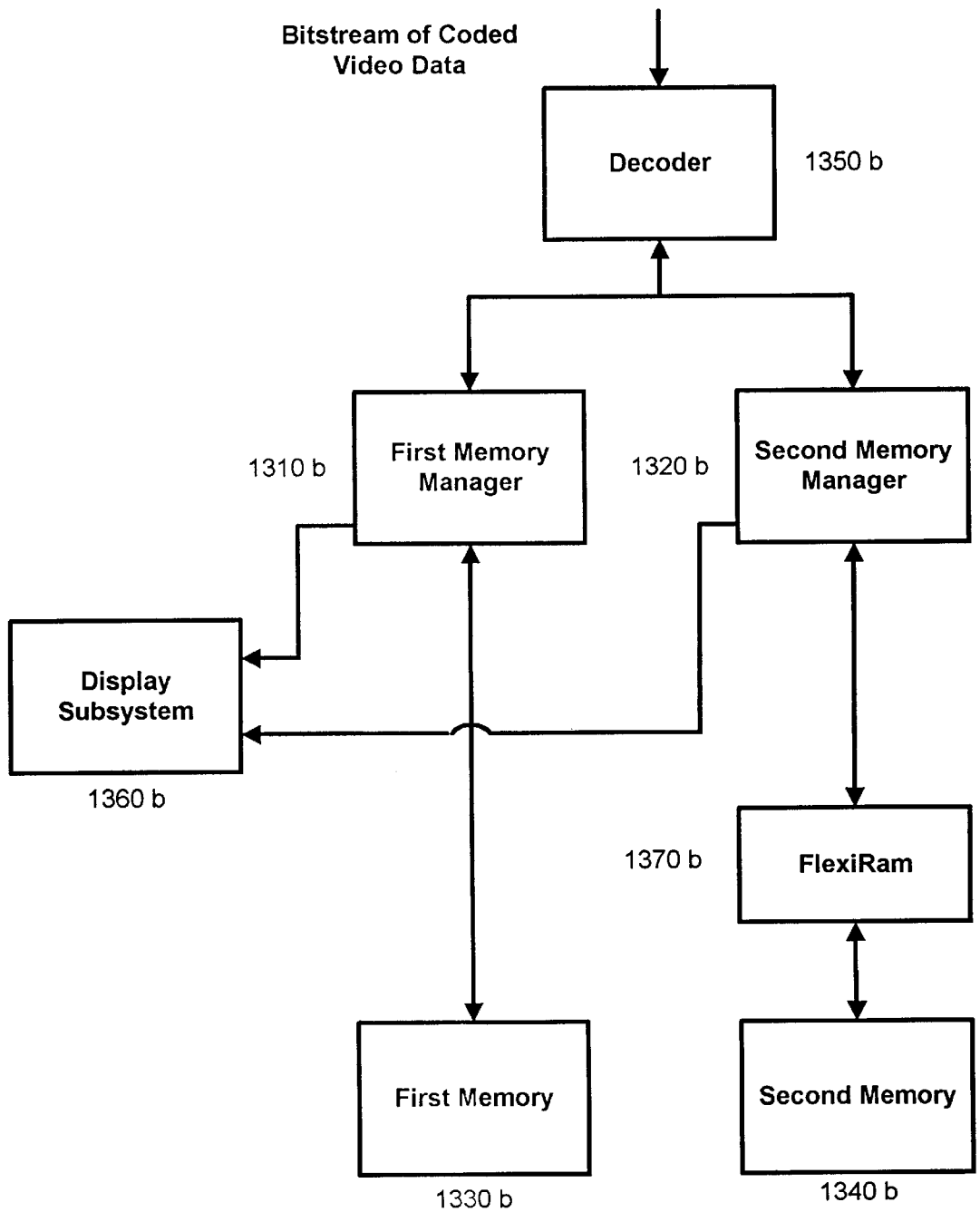
Figure 13:
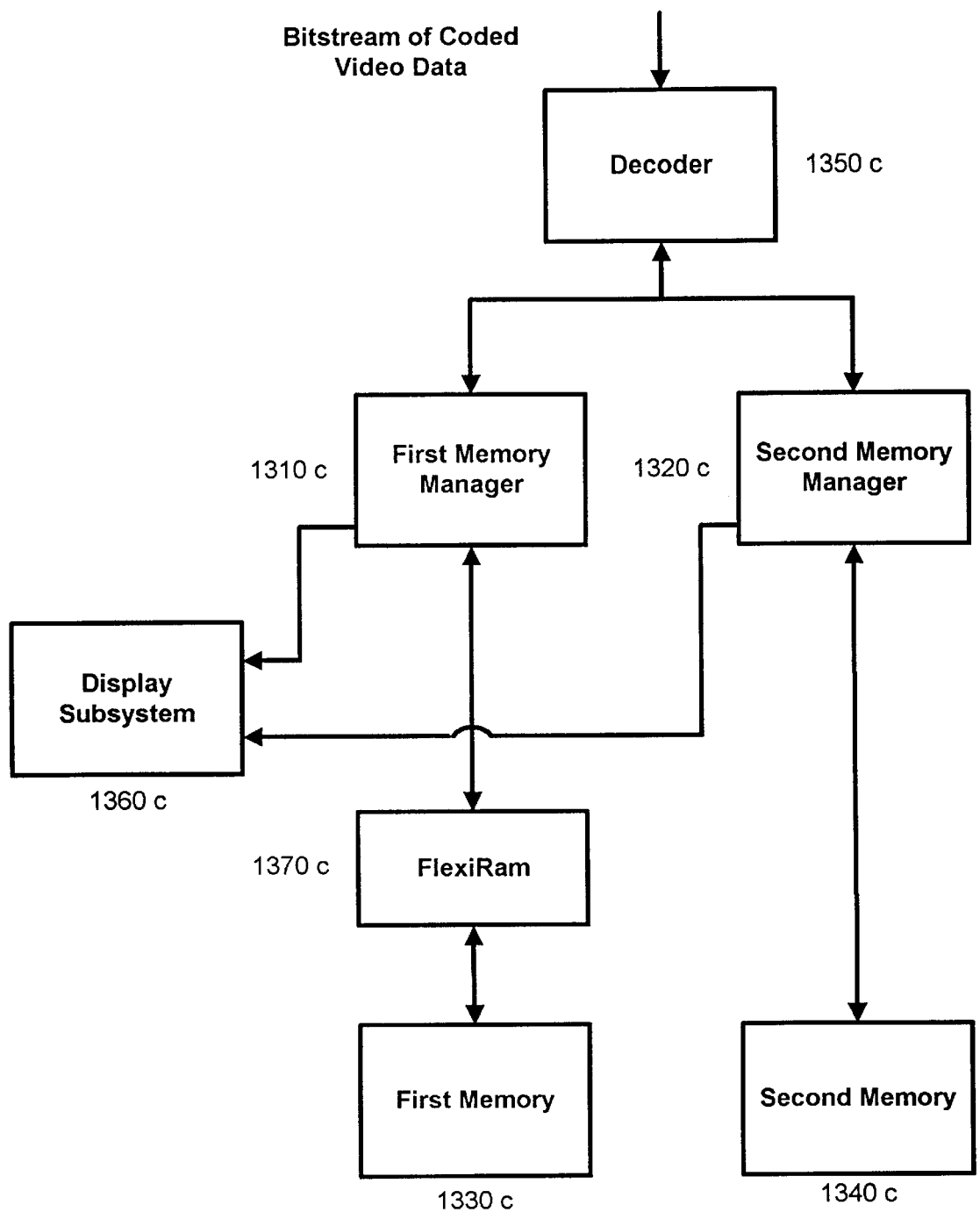

FIGS. 13a, 13b and 13c show three different embodiments of the present invention combining the FlexiRam design and the split memory manager design. FIG. 13a shows one of the two preferred embodiments of the present invention. In this embodiment, two FlexiRam compressor/decompressor are used. The first FlexiRam 1370a is positioned between the First Memory Manager 1310a and the First Memory 1330a. The second FlexiRam 1380a is positioned between the Second Memory Manager 1320a and the Second Memory 1340a so that all stored video memory data are compressed and decompressed using the FlexiRam technique. FIG. 13b shows another embodiment of the present invention. The FlexiRam 1370b is positioned between the Second Memory Manager 1320b and the Second Memory 1340b so that only video data for the bidirectional frames (i.e. B) are compressed when stored in the video memory. Finally, FIG. 13c shows yet another embodiment of the present invention. The FlexiRam 1370c is positioned between the First Memory Manager 1310c and the First Memory 1330c so that only video data for the prediction frames (i.e. 2I; 1I and 1P; or 2P) are compressed when stored in the video memory. It should be noted that the present invention does not limit the number of the memory managers to 2 or 3. The memory manager can be split to a number (i.e. greater than 3) of separate memory managers to process different types and/or groups of video data.

The most important factors in considering which embodiment should be implemented for a specific system are the amount of video memory available, processing speed available, and picture quality desired, etc.

For example, in addition to the abovementioned embodiments, the FlexiRam design can be applied to compress and decompress either all three color components or just 2 chroma color components.

The design can be further improved by combining all these above disclosed embodiments and aspects. For example, in one embodiment, only the U and V color components in a B picture are compressed by the FlexiRam design. Or, in another embodiment, all the three color components for all the two picture groups (i.e. reference frames, or bidirectional frames) are compressed by the FlexiRam design.

The design flexibility of the present invention in combining the Split Memory Manager, FlexiRam, and splitting the color primaries provides tremendous advantages in design freedom by providing the system designer the ability to choose the most appropriate and efficient combination in response to different video system requirements, video memory sizes, and picture quality desired, etc.

Figure 14:
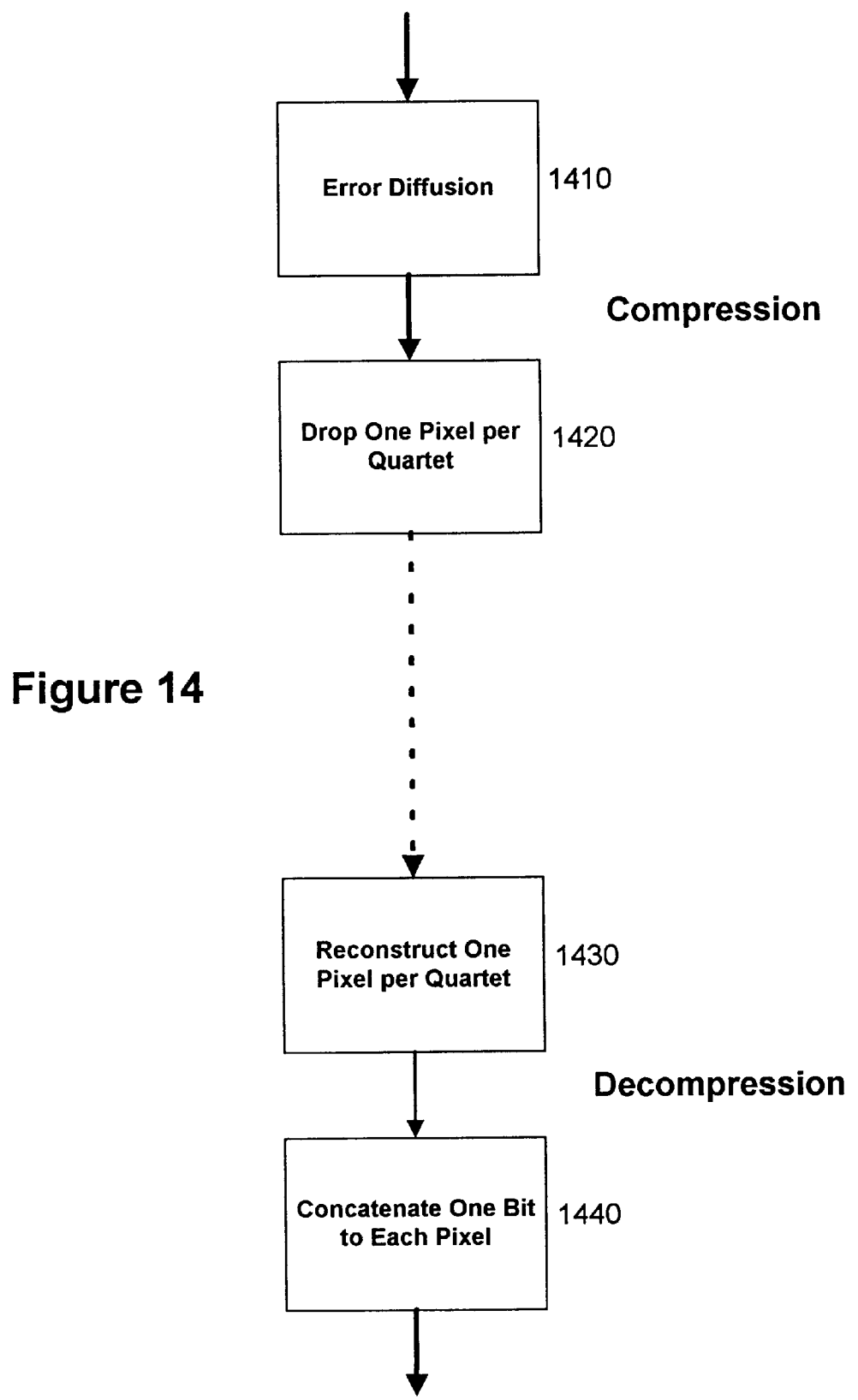
FIG. 14 is a block diagram showing the steps of the video data compression and decompression.

FIG. 14 summarizes a preferred embodiment of the FlexiRam design. As shown in the figure, the data compression comprises 2 steps: (1) error diffusion (step 1410); and (2) drop One pixel per quartet (step 1420).

First the video data is compressed according to an error diffusion algorithm (step 1410). In a preferred embodiment, the basic compression unit is defined as a "quartet" which includes four consecutive horizontal pixels. The error diffusion compression step (step 1410) separately compresses each pixel of a quartet. Using a one-bit error diffusion algorithm, a quartet of pixels originally having 32 bits (4 pixels*8 bits/pixel) is compressed to 28 bits (4 pixels*7 bits/pixel). Note that this invention does not limit to the one-bit error diffusion algorithm, multiple-bits error diffusion algorithm can be implemented similarly, however, with a tradeoff of loss in perceptible picture quality.

The second step of the video data compression is the "drop one pixel per quartet" (step 1420). The drop one pixel per quartet algorithm compresses a quartet of four 7-bits pixels to a 24-bits quartet. The data compressor calculates the best pixel of a quartet to be dropped and stores the reconstruction method in the last three bits of the quartet as the reconstruction descriptor ("RD"). After this compression step, the compressed quartet of pixels has 24 bits (3 pixels*7 bits/pixel+3 bits RD). Detailed algorithm of this drop one pixel per quartet will be described later.

When the video data is needed from the video memory, the FlexiRam performs decompression to the compressed data read from the memory. The decompression steps are the inverse of the compression steps as shown in FIG. 14.

First, a pixel is added back to each 24-bits quartet by the reconstruct one pixel per quartet algorithm which is the inverse of the drop one pixel per quartet algorithm (step 1430). This decompression step reconstructs the 7-bits dropped pixel according to the reconstruction method provided by the RD stored as the last three bits of the 24 bits representing the quartet. After this decompression step (step 1430), the quartet is reformed to have a four 7-bits pixels. A preferred reconstruction algorithm will be described in detail later.

Then, each of the 7-bits pixels is then concatenated with a "0" to return to the pre-compressed four 8-bits pixels quartet (step 1440). This decompression step (step 1440) concatenates a "0" to every pixel as the least significant bit to reform the four 8-bits pixels.

Figure 15:
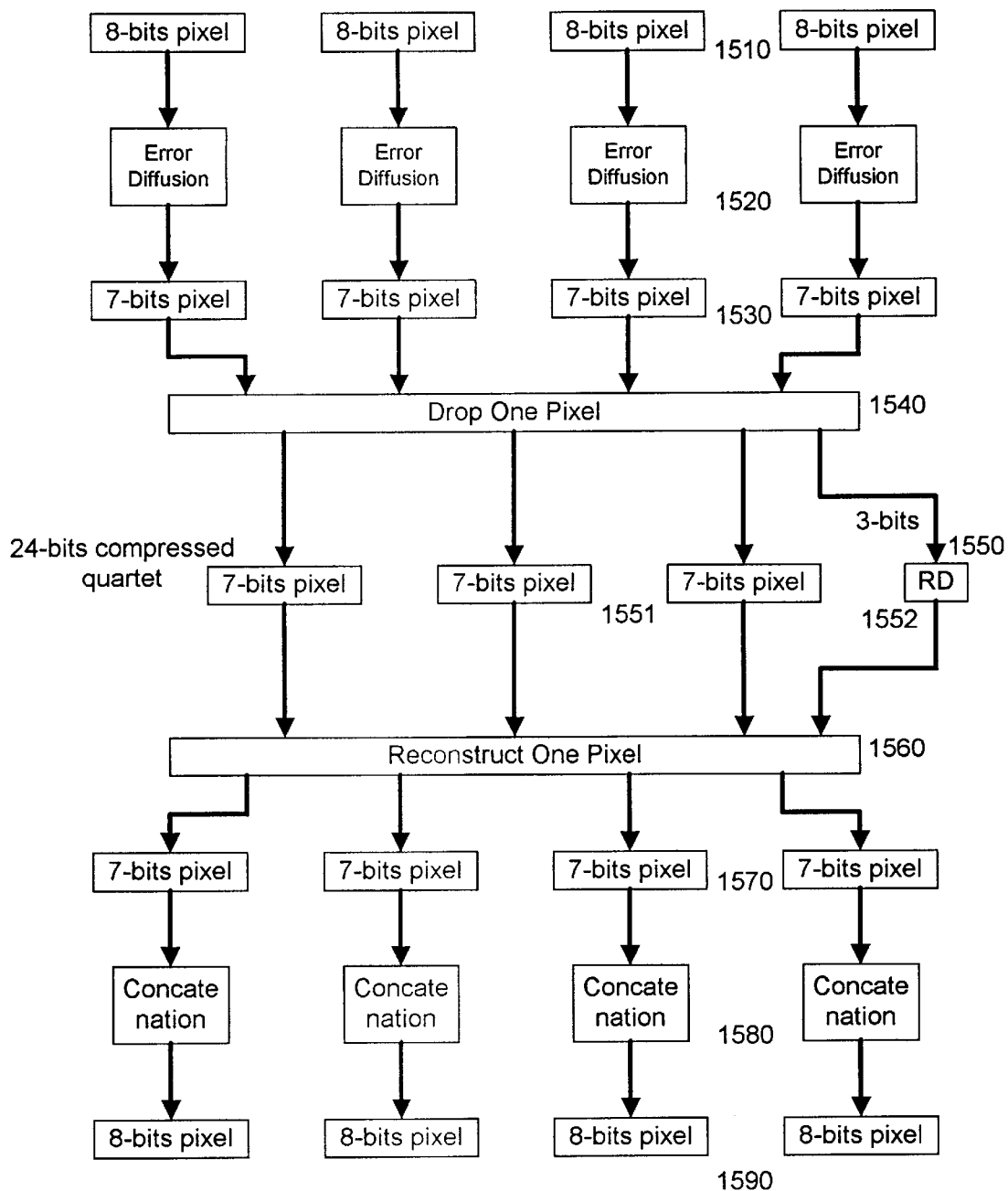
FIG. 15 shows the video data format of a quartet during different steps of the compression and decompression.

FIG. 15 illustrates the data format of a quartet (i.e. four 8-bits pixels) of video data during the different processes in the steps of compression and decompression.

First, each of the 8-bits pixel of a quartet 1510 is individually compressed using an error diffusion algorithm 1520. The intermediate compressed data comprises four 7-bits pixels 1530. Then the four 7-bits pixels 1530 are further compressed by the drop one pixel per quartet algorithm 1540. The final compressed data comprises three 7-bits pixels 1551 and a 3-bits RD 1552.

The total length of the compressed data is 24 bits.

When the video data is needed from the video memory, the compressed data is decompressed by the following two consecutive steps.

First, an additional pixel is generated according to the Reconstruct One Pixel per Quartet algorithm 1560 which is the inverse of the drop one pixel per quartet algorithm 1540 based on the 3-bits RD 1552 of the 24-bits compressed data 1550. The intermediate decompressed data 1570 comprises four 7-bits pixels. Then, each of the four 7-bits pixels concatenates with a "0" as the least significant bit 1580 so the pre-compressed four 8-bits pixels are reformed.

The details of the error diffusion and drop one pixel per quartet algorithms are explained as follows:

A. ERROR DIFFUSION

It should be noted that various error diffusion algorithms can be used for this compression step. The following disclosed preferred embodiment utilizes a one-bit error diffusion algorithm. However, the present invention is not limited to any specific algorithm used for the error diffusion process. In addition, as previously discussed, multiple bits (more than one) can be eliminated by the error diffusion algorithm if more degradation in the picture quality is allowed. Therefore, the following particular one-bit error diffusion algorithm is disclosed for illustration purposes only.

In this preferred embodiment of the present invention, the error diffusion (ED) algorithm works on every line in the picture independently. At the beginning of the line a 1-bit register denoted as "e" is set to one. "e" stores the current running error and is updated on a pixel base. The one-bit ED algorithm is described by the following two equations:

$$I_{out}(j)=2*\text{floor}[(I_{in}(j)+e(j))/2]$$

except if $I_{in}(j)=255$ and $e(j)=1$, then $Iout(j)=255$ $$e(j+1)=I_{in}(j)+e(j)-I_{out}(j)$$

where:

j—the index of the current pixel in the row.

$I_{in}(j)$—the original value of the pixel.

$I_{out}(j)$—the new value of the pixel (after ED).

e(j)—the error accumulator at the time of pixel j.

floor (x)—the nearest integer smaller or equal to x.

After the $I_{out}(j)$ is calculated, the least significant bit of $I_{out}(j)$ is dropped so that this algorithm quantizes the 8-bits pixels into 7-bits pixels, while eliminating false contour effects.

This algorithm can be illustrated as below, or example:

Assuming, in one case, the $I_{in}(j)$ is 182, binary 10010111, and e(j) is 1:

$$Iout(j)=2*\text{floor }((10010111+1)/2)$$
$$=2*\text{floor }(10011000/2)$$
$$=2*\text{floor }01001100$$
$$=1001100$$
$$e(j+1)=10010111+1-1001100$$
$$=0$$

By dropping the least significant bit, the stored quantized pixel is=100110.

The "e" value is then propagated to the end of the line. Since the ED algorithm of the present invention works on a raster structure and pictures are written to memory in block structure, it is necessary to store e(j) at the end of a block line. This value is used when the ED continues with the next pixel in the same line (which belongs to another block). Therefore, an 8-bits latch must be used for every "discontinued" block. (e can only be 0 or 1, so 1-bit per every discontinued line is sufficient.).

The decompression step 1580 is the inverse of the above-mentioned compression step. In the preferred embodiment, the data is concatenated with "0" to every pixel to reform four 8-bits pixels.

Each of the 7-bits pixels is then concatenated with a "0" as the least significant bit. For example, a "1101101" will be reformed to a "11011010". Therefore, the resulting data is a four 8-bits pixels as with the original uncompressed data.

After the data is compressed using the one-bit error diffusion algorithm, four bits are dropped so that a quartet having four 8-bits pixels is compressed to four 7-bits pixels. It is true that higher compression rate can be achieved by implementing a "two" bits error diffusion algorithm that can compress a quartet having four 8-bits pixels to four 6-bits pixels. The compression rate of using the two-bits error diffusion algorithm is 24/32×100% (i.e. 75%). However, it is found that there is a perceptible deterioration in picture quality after the compression and decompression using the two-bits error diffusion technique. Therefore, instead of the using the two-bits error compression technique, the present invention discloses a two steps compression/decompression process: (1) One-bit error diffusion; and (2) drop one pixel per quartet. The resulting picture quality after the two steps compression and decompression process disclosed as the present invention provides perceptible improvement over the two-bits error diffusion technique even though the compression rates of the two techniques are identical (i.e. 75%).

B. DROP ONE PIXEL PER QUARTET

The second compression step of the preferred embodiment of the present invention is the drop one pixel per quartet method. The drop one pixel per quartet algorithm 1540 compresses a four 7-bits pixels to three 7-bits pixels plus 3 bits reconstruction descriptor ("RD") (i.e. 24 bits total).

It should be noted that various pixels dropping algorithms can be used for reducing the number of pixels stored in the video memory. The present invention is not limited to any specific pixels dropping algorithms and equations used during the compression and decompression processes. In addition, multiple pixels (more than one) can be dropped with a tradeoff of the degradation in picture quality. The following drop one pixel per quartet is disclosed as the preferred embodiment of the present invention with the best balance of the memory saved with little perceptible effect on the picture quality.

In a preferred embodiment, each of the four pixels of a quartet is named as P0, P1, P2, or P3 consecutively. Pixels P1 and P2 are the two candidates to be dropped. The algorithm predicts (1) which pixel is the better one to drop and (2) what reconstruction method should be used in the decompression to estimate the dropped pixel. There are five possible reconstruction methods for each candidate:

1. Copy the left neighbor.
2. Copy the right neighbor.
3. Average the left neighbor and the right neighbor.
4. Sum ¼ of the left neighbor and ¾ of the right neighbor.

5. Sum ¾ of the left neighbor and ¼ of the right neighbor.

Theoretically, dropping P1 and estimating it by copying P2 is equivalent to dropping P2 and estimating it by copying P1. Thus, for the two candidates (i.e. P1 and P2) there are only 9 possible estimators (and not 10). Moreover, after dropping one pixel from the quartet, there will be 21 bits left to represent the remaining 3 pixels. In the preferred embodiment, the target size of the final compressed data for each quartet is 24 bits (25% compression). This means that only 3 bits can be allocated to describe the selected estimator, thus only 8 estimators can actually be considered. The estimator that is omitted out of consideration is reconstructing P2 by ¾ of the left neighbor and ¼ of the right neighbor. The reason for omitting this particular estimator is that statistics of MPEG pictures show that it is the least probable to be chosen as the best one (among the four ¼, ¾ estimators the choice is arbitrary).

First, the 8 estimators are calculated:

$P^0_1 = P0$ ($P^k_i$ denotes the estimator of Pi using method $k$)

$P^0_1 = P2$ $P^2_1 = 0.5P0 + 0.5P2$ $P^3_1 = 0.25P0 + 0.75P2$ $P^4_1 = 0.75P0 + 0.25P2$ $P^1_2 = P3$ $P^2_2 = 0.5P1 + 0.5P3$ $P^3_2 = 0.25P1 + 0.75P3$

For every estimator the absolute estimation error is defined as $E^k_i = |P^k_i - Pi|$. The minimal error is found: $\min_{i, k}\{E^k_i\}$. If there is more than one minimal error, the choice is arbitrary. (Decision is left open for the implementation). Finally, according to the minimum error, $P_{imin}$ is dropped and a 3-bits reconstruction descriptor (RD) is set to indicate the selected estimator, $P^{kmin}_{imin}$. The 3-bits RD is concatenated to the three 7-bits remaining pixels, forming together a 24-bits compressed quartet. The method of concatenation is left open for implementation.

The decompression of the compressed data is simply the inverse of the compression algorithm. The missing 7-bits dropped pixel is reconstructed using the RD at the end of each quartet to select (1) which pixel for reconstruction (i.e. P1 or P2); and (2) which reconstruction method for reconstruction.

As shown in FIG. 15, the data decompressor obtains the reconstruction method provided by the three bits of RD. Then the pixel for reconstruction is determined (P1 or P2) and the pixel reconstruction is performed according to the inverse of the eight equations as discussed above.

It should be pointed out that the present invention is not limited to any specific methods and equations used in the video data compression steps of the (1) error diffusion, and (2) pixel dropping. The key feature of the FlexiRam design disclosed as the present invention is the specific sequence of these two data compression/decompression steps: the video data is first compressed by reducing the number of bits per pixel using an error diffusion algorithm. Then, the intermediate compressed video data is further compressed using a pixel dropping algorithm to drop a pixel(s) among a specific group of pixels. As previously discussed, the decompression process is just the inverse of the compression process.

4. CONCLUSIONS

It is to be understood that while the invention has been described above in conjunction with preferred specific embodiments, the description and examples are intended to illustrate and not limit the scope of the invention, which is defined by the scope of the appended claims.

What is claimed is:

1. A system for decoding and displaying a bitstream of data representing coded video images, comprising:
    a decoder for decoding said bitstream of data, wherein the decoded data comprises reference frames data and bidirectional frames data;
    a first video memory manager coupled to said decoder, wherein said first video memory manager handles said reference frames data;
    a first video memory coupled to said first video memory manager for storing said reference frames data;
    a second video memory manager coupled to said decoder, wherein said second video memory manager handles said bidirectional frames data;
    a second video memory coupled to said second video memory manager for storing said bidirectional frames data; and
    a display subsystem coupled with said first video memory manager and said second video memory manager for displaying said video images.

2. The system according to claim 1, wherein said second video memory has a storage capacity smaller than a storage capacity sufficient to store decoded video image information for one entire frame.

3. The system according to claim 1, wherein said first video memory has a storage capacity sufficient to store decoded video image information for two entire frames.

4. The system according to claim 1, wherein said first video memory has a storage capacity sufficient to store decoded video image information for two entire frames, and further wherein said second video memory has a storage capacity smaller than a storage capacity sufficient to store decoded video image information for one entire frame.

5. The system according to claim 1, wherein said first video memory manager is provided with a top-field-first signal and a repeat top field signal.

6. The system according to claim 1, wherein said second video memory manager is provided with said top-field-first signal.

7. The system according to claim 1, wherein said first video memory manager is provided with a top-field-first signal and a repeat top field signal, and further wherein said second video memory manager is provided with said top-field-first signal.

8. The system according to claim 1, further comprising:
    a data compressor coupled to said second video memory manager and said second video memory, wherein said data compressor compresses said bidirectional frames data to be stored in said second video memory; and
    a data decompressor coupled to said second video memory manager and said second video memory, wherein said data decompressor decompresses said compressed bidirectional frames data read from said memory.

9. The system according to claim 8, wherein said data compressor comprises an error diffusion mechanism and a pixel dropping mechanism for compressing said video data, and further wherein said data decompressor comprises a pixel reconstruction mechanism and a bit concatenation mechanism for decompressing said compressed video data stored in said video memory.

10. A method for decoding and displaying a bitstream of data representing coded video images, comprising:

decoding said bitstream of data to provide reference frames data and bidirectional frames data;

storing said reference frames data in a first video memory;

storing said bidirectional frames data in a second video memory;

retrieving said reference frames data from said first video memory;

retrieving said bidirectional frames data from said second video memory; and displaying the video images from said bidirectional frames data and said reference frames data.

11. The method according to claim 10, wherein said second video memory has a storage capacity smaller than a storage capacity sufficient to store decoded video image information for one entire frame.

12. The method according to claim 10, wherein said first video memory has a storage capacity sufficient to store decoded video image information for two entire frames.

13. The method according to claim 10, wherein said first video memory has a storage capacity sufficient to store decoded image information for two entire frames, and further wherein said second video memory has a storage capacity smaller than a storage capacity sufficient to store decoded video image information for one entire frame.

14. The method according to claim 10, wherein said step of storing said bidirectional frames data in said second video memory further comprises a step of compressing said bidirectional frames data before storing in said second video memory, and further wherein said step of retrieving said bidirectional frames data from said second video memory further comprises a step of decompressing said compressed bidirectional frames data.

15. A video decoding and displaying system, comprising:
a video memory partitioned into a first number of memory segments;
a display picture partitioned into a second number of display segments, each of the display segments corresponds to an entry in a display segment list, wherein the second number is larger than the first number; and
a memory manager for maintaining a logical sliding window, said logical sliding window comprises a third number of the display segment list entries, the third number of the display segment list entries in the logical sliding window is maintained to be less than or equal to the first number of the memory segments in the video memory, wherein each of the display segment entries in said logical sliding window refers to a memory segment having video data written into but has not been displayed.

16. The video decoding and displaying system according to claim 15, wherein said display picture is a B picture.

17. The video decoding and displaying system according to claim 15, wherein said display picture is an I picture.

18. The video decoding and displaying system according to claim 15, wherein said display picture is a P picture.

19. The video decoding and displaying system according to claim 15, wherein the memory manager releases a display segment entry from the logical sliding window after the corresponding memory segment has been read from said video memory.

20. The video decoding and displaying system according to claim 15, wherein the memory manager adds a display segment entry to the logical sliding window after the corresponding memory segment has been written into.

21. The video decoding and displaying system according to claim 15, wherein the memory manager releases a memory segment from the logical sliding window after said memory segment has been read from the video memory, and further wherein the memory manager adds a memory segment to the logical sliding window after memory segment has been written into.

22. The video decoding and displaying system according to claim 15, wherein said logical sliding window comprises a logical top window corresponding to a top field of an interlaced picture and a logical bottom window corresponding to a bottom field of said interlaced picture.

23. The video decoding and displaying system according to claim 15, wherein said memory manager handles both Field-pictures and Frame-pictures.

24. A video decoding and displaying system comprising:
a video memory partitioned into a plurality of memory segments;
a memory segment list having a plurality of entries, each of the entries of the memory segment list corresponds to a memory segment in the video memory, each of the entries of the memory segment list comprises a busy indicator indicating whether the corresponding memory segment has been written to but not read from;
a display picture partitioned into a plurality of display segments;
a display segment list having a plurality of entries, each of the entries of the display segment list corresponds to a display segment in the display picture, each of the entries of the display segment list comprises an index pointing to an entry in the memory segment list, said display segment list comprises a top portion and a bottom portion, each of the top portion and the bottom portion comprises half of the plurality of entries of said display segment list;
a read pointer pointing to an entry of said display segment list, wherein the memory segment referring to by the entry of the display segment list pointed by the read pointer storing the video data to be displayed next; and
a first write pointer and a second write pointer pointing to two different entries of said display segment list, wherein when the display picture is in Field-picture format, the first write pointer points to an entry in the top portion of the display segment list whereas the second write pointer points to an entry in the bottom portion of the display segment list, and further wherein when the display picture is in Frame-picture format, the first write pointer and the second write pointer has a fixed interval of 1 between.

25. A system for displaying video images, comprising:
a video memory;
a memory manager for receiving a bitstream of video data representing said video images;
a display subsystem coupled to said memory manager for displaying said video images;
a data compressor coupled to said memory manager and said video memory, said data compressor compresses the video data to be stored in said video memory; and
a data decompressor coupled to said memory manager and said video memory, said data decompressor decompresses said compressed video data read from said video memory for said memory manager.

26. The system according to claim 25, wherein said data compressor is lossy.

27. The system according to claim 25, wherein said data compressor is lossless.

28. The system according to claim 25, wherein said data compressor comprises an error diffusion mechanism and a pixel dropping mechanism for compressing said video data.

29. The system according to claim 28, wherein said data decompressor comprises a pixel reconstruction mechanism and a bit concatenation mechanism for decompressing said compressed video data stored in said video memory.

30. The system according to claim 25, wherein said data compressor comprises an error diffusion mechanism and a pixel dropping mechanism for compressing said video data, and further wherein said data decompressor comprises a pixel reconstruction mechanism and a bit concatenation mechanism for decompressing said compressed video data stored in said video memory.

31. The system according to claim 30, wherein said error diffusion mechanism is an one-bit error diffusion mechanism, said pixel dropping mechanism is a drop one pixel per quartet mechanism, said pixel reconstruction mechanism is a reconstruct one pixel per quartet mechanism, and said bit concatenation mechanism is a zero concatenation mechanism.

32. A method for decoding and displaying video images, comprising:
   decoding a bitstream of coded video data representing said video images;
   providing the decoded video data to a memory manager;
   compressing the decoded video data;
   storing the compressed video data in a video memory;
   reading said compressed video data from the video memory; and
   decompressing the compressed video data for a display subsystem to display said video images.

33. The method according to claim 32, wherein the video data compressing step is lossy.

34. The method according to claim 32, wherein the video data compressing step is lossless.

35. The method according to claim 32, wherein the data compressing step comprises an error diffusion step and a pixel dropping step, and the data decompression step comprises a pixel reconstruction step and a bit concatenation step.

36. A system for decoding and displaying a bitstream of data representing coded video images, comprising:
   a decoder for decoding said bitstream of data, wherein the decoded data comprises reference frames data and bidirectional frames data;
   a first video memory manager coupled to said decoder, wherein said first video memory manager handles said reference frames data;
   a first video memory coupled to said first video memory manager for storing said reference frames data;
   a second video memory manager coupled to said decoder, wherein said second video memory manager handles said bidirectional frames data;
   a second video memory coupled to said second video memory manager for storing said bidirectional frames data; and
   a display subsystem coupled with said first video memory manager and said second video memory manager for displaying said video images.

37. The system according to claim 36, wherein said second video memory has a storage capacity smaller than a storage capacity sufficient to store decoded video image information for one entire frame.

38. The system according to claim 36, wherein said first video memory has a storage capacity sufficient to store decoded video image information for two entire frames.

39. The system according to claim 36, wherein said first video memory has a storage capacity sufficient to store decoded video image information for two entire frames, and further wherein said second video memory has a storage capacity smaller than a storage capacity sufficient to store decoded video image information for one entire frame.

40. The system according to claim 36 further comprising:
   a data compressor coupled to said second video memory manager and said second video memory, said data compressor compresses said bidirectional frames data to be stored in said second video memory; and
   a data decompressor coupled to said second video memory manager and said second video memory, said data decompressor decompresses the compressed bidirectional frames data read from said second video memory.

41. The system according to claim 36 further comprising:
   a data compressor coupled to said first video memory manager and said first video memory, said data compressor compresses said reference frames data to be stored in said first video memory; and
   a data decompressor coupled to said first video memory manager and said first video memory, said data decompressor decompresses the compressed reference frames data read from said first video memory.

42. The system according to claim 36 further comprising:
   a first data compressor coupled to said first video memory manager and said first video memory, said data compressor compresses said reference frames data to be stored in said first video memory;
   a first data decompressor coupled to said first video memory manager and said first video memory, said data decompressor decompresses the compressed reference frames data read from said first video memory;
   a second data compressor coupled to said second video memory manager and said second video memory, said data compressor compresses said bidirectional frames data to be stored in said second video memory; and
   a second data decompressor coupled to said second video memory manager and said second video memory, said data decompressor decompresses the compressed bidirectional frames data read from said second video memory.

43. The system according to claim 36, wherein said data compressor comprises an error diffusion mechanism and a pixel dropping mechanism for compressing said video data, and further wherein said data decompressor comprises a pixel reconstruction mechanism and a bit concatenation mechanism for decompressing said compressed video data stored in said video memory.

44. A system for decoding and displaying a bitstream of video data representing coded video images, comprising:
   a decoder for decoding said bitstream of video data;
   a plurality of video memory managers coupled to said decoder, each of said plurality of video memory managers coupled to a video memory, wherein each of the plurality of video memory managers handles a portion of the decoded video data; and
   a display subsystem coupled to said plurality of video memory managers for displaying said video images.

45. The system according to claim 44, wherein the decoded video data comprises reference frames data and bidirectional frames data; and wherein said plurality of video memory managers comprise:
   a first memory manager for handling reference frames data of the decoded video data; and
   a second memory manager for handling bidirectional frames data of the decoded video data.

46. The system according to claim 44, wherein the decoded video data comprises video data for P frames, video data for I frames, and video data for B frames; and wherein said plurality of video memory managers comprise:
- a first memory manager for handling the video data for P frames;
- a second memory manager for handling the video data for I frames; and
- a third memory manager for handling the video data for B frames.

47. The system according to claim 44, wherein the decoded video data comprises video data for first chroma component, video data for second chroma component, and video data for third chroma component; and wherein said plurality of video memory managers comprise:
- a first memory manager for handling the video data for first chroma component;
- a second memory manager for handling the video data for second chroma component; and
- a third memory manager for handling the video data for third chroma component.

48. The system according to claim 44, wherein the decoded video data comprises video data for Y, U and Y chroma components; and wherein said plurality of video memory managers comprise:
- a first memory manager for handling the video data for Y chroma component; and
- a second memory manager for handling the video data for U and V chroma components.

49. The system according to claim 44 further comprising:
- at least one data compressor coupled to at least one of said plurality of video memory managers and the respective coupling video memory, said at least one data compressor compresses the decoded video data to be stored in the respective coupling video memory; and
- at least one data decompressor coupled to said at least one of said plurality of video memory managers and the respective coupling video memory, said at least one data decompressor decompresses the compressed video data read from said respective coupling video memory.

50. The system according to claim 49, wherein the at least one data compressor is lossy.

51. The system according to claim 49, wherein the at least one data compressor is lossless.

52. The system according to claim 49, wherein said at least one data compressor comprises an error diffusion mechanism and a pixel dropping mechanism for compressing said video data, and further wherein said at least one data decompressor comprises a pixel reconstruction mechanism and a bit concatenation mechanism for decompressing said compressed video data stored in said video memory.

* * * * *